United States Patent
Watanabe et al.

(10) Patent No.: US 10,322,672 B2
(45) Date of Patent: *Jun. 18, 2019

(54) VEHICLE CONTROL APPARATUS AND PROGRAM WITH ROTATIONAL CONTROL OF CAPTURED IMAGE DATA

(71) Applicant: AISIN SEIKI KABUSHIKI KAISHA, Kariya-shi, Aichi-ken (JP)

(72) Inventors: Kazuya Watanabe, Anjo (JP); Tetsuya Maruoka, Anjo (JP)

(73) Assignee: AISIN SEIKI KABUSHIKI KAISHA, Kariya-shi, Aichi (JP)

( * ) Notice: Subject to any disclaimer, the term of this patent is extended or adjusted under 35 U.S.C. 154(b) by 251 days.

This patent is subject to a terminal disclaimer.

(21) Appl. No.: 14/770,320

(22) PCT Filed: Jan. 10, 2014

(86) PCT No.: PCT/JP2014/050387
§ 371 (c)(1),
(2) Date: Aug. 25, 2015

(87) PCT Pub. No.: WO2014/132680
PCT Pub. Date: Sep. 4, 2014

(65) Prior Publication Data
US 2015/0375680 A1    Dec. 31, 2015

(30) Foreign Application Priority Data

Feb. 28, 2013 (JP) .................................. 2013-039895
Mar. 25, 2013 (JP) .................................. 2013-062440

(51) Int. Cl.
*B60R 1/00* (2006.01)
*B60K 35/00* (2006.01)
*G06T 3/60* (2006.01)

(52) U.S. Cl.
CPC ............... *B60R 1/00* (2013.01); *B60K 35/00* (2013.01); *G06T 3/60* (2013.01); *B60R 2300/30* (2013.01);
(Continued)

(58) Field of Classification Search
None
See application file for complete search history.

(56) References Cited

U.S. PATENT DOCUMENTS

2003/0108222 A1    6/2003  Sato et al.
2008/0309764 A1*  12/2008  Kubota ..................... B60R 1/00
                                                    348/148
(Continued)

FOREIGN PATENT DOCUMENTS

EP    0980828 A1 *  2/2000 ............ B64D 47/08
JP    1273746 A    11/1989
(Continued)

OTHER PUBLICATIONS

Machine Translation of Japanese publication No. 09-052555 to Fumihisa et al., tilted "periphery Monitoring Device" published in Feb. 25, 1997 (Year: 1997).*

(Continued)

*Primary Examiner* — Navid Ziaeianmehdizadeh
(74) *Attorney, Agent, or Firm* — Sughrue Mion, PLLC

(57) ABSTRACT

A vehicle control apparatus of the embodiment includes an acquisition portion acquiring captured image data output from an imaging portion that is provided at a vehicle and that images a surrounding of the vehicle, and vehicle state data output from a vehicle state detection portion provided at the vehicle, and a control portion performing a rotation control on the captured image data based on an inclination in a left-right direction of the vehicle relative to a horizontal direction which serves as a direction included in a horizontal (Continued)

plane orthogonal to a direction of gravity, the inclination in the left-right direction of the vehicle being calculated from the vehicle state data, the control portion performing the rotation control in a manner that a horizontal line included in a subject captured in the captured image data is substantially parallel to a lateral-direction side with respect to a display region serving as an output destination.

13 Claims, 17 Drawing Sheets

(52) U.S. Cl.
CPC ... *B60R 2300/605* (2013.01); *B60R 2300/607* (2013.01); *B60R 2300/802* (2013.01)

(56) References Cited

U.S. PATENT DOCUMENTS

| | | | |
|---|---|---|---|
| 2010/0164702 A1 | 7/2010 | Sasaki et al. | |
| 2010/0270133 A1* | 10/2010 | Baker | H01H 25/041 200/4 |
| 2012/0162427 A1* | 6/2012 | Lynam | B60R 1/00 348/148 |
| 2012/0262580 A1* | 10/2012 | Huebner | B60R 1/00 348/148 |
| 2013/0222275 A1* | 8/2013 | Byrd | G06F 3/04883 345/173 |
| 2014/0009415 A1* | 1/2014 | Nishida | G06F 3/04886 345/173 |
| 2015/0022664 A1* | 1/2015 | Pflug | H04N 7/181 348/148 |
| 2015/0033176 A1* | 1/2015 | Miichi | G09B 29/007 715/771 |
| 2015/0183371 A1* | 7/2015 | Okada | B60R 1/00 348/148 |

FOREIGN PATENT DOCUMENTS

| | | |
|---|---|---|
| JP | 09-052555 A | 2/1997 |
| JP | 2002-354467 A | 12/2002 |
| JP | 2003-009141 A | 1/2003 |
| JP | 2003-244688 A | 8/2003 |
| JP | 2007-266930 A | 10/2007 |
| JP | 2009-212703 A | 9/2009 |

OTHER PUBLICATIONS

Proceedings of the 2007 IEEE, International Conference on Robotics and Biomimetics, Dec. 15-18, 2007, Sanya, China (Year: 2008).*
Miyauchi, R. et al., "Compact Image Stabilization System Using Camera Posture Information", Journal of Field Robotics, 2008, vol. 25, No. 4-5, XP-002734543, pp. 268-283.
"3D Motion Sensor Developer's Kit MDP-A3U9S-DK", NEC Tokin Corporation, Mar. 17, 2009, vol. 3, pp. 1-4.
Communication dated Nov. 29, 2016 from the European Patent Office in counterpart Application No. 14 757 301.8.
International Search Report for PCT/JP2014/050387 dated Feb. 25, 2014.
Communication dated Mar. 11, 2016, issued by the European Patent Office in corresponding European Application No. 14757301.8.
Communication dated Mar. 5, 2018 from the State Intellectual Property Office of the P.R.C. in counterpart Chinese application No. 201480010443.7.

* cited by examiner 601    602

F I G. 10
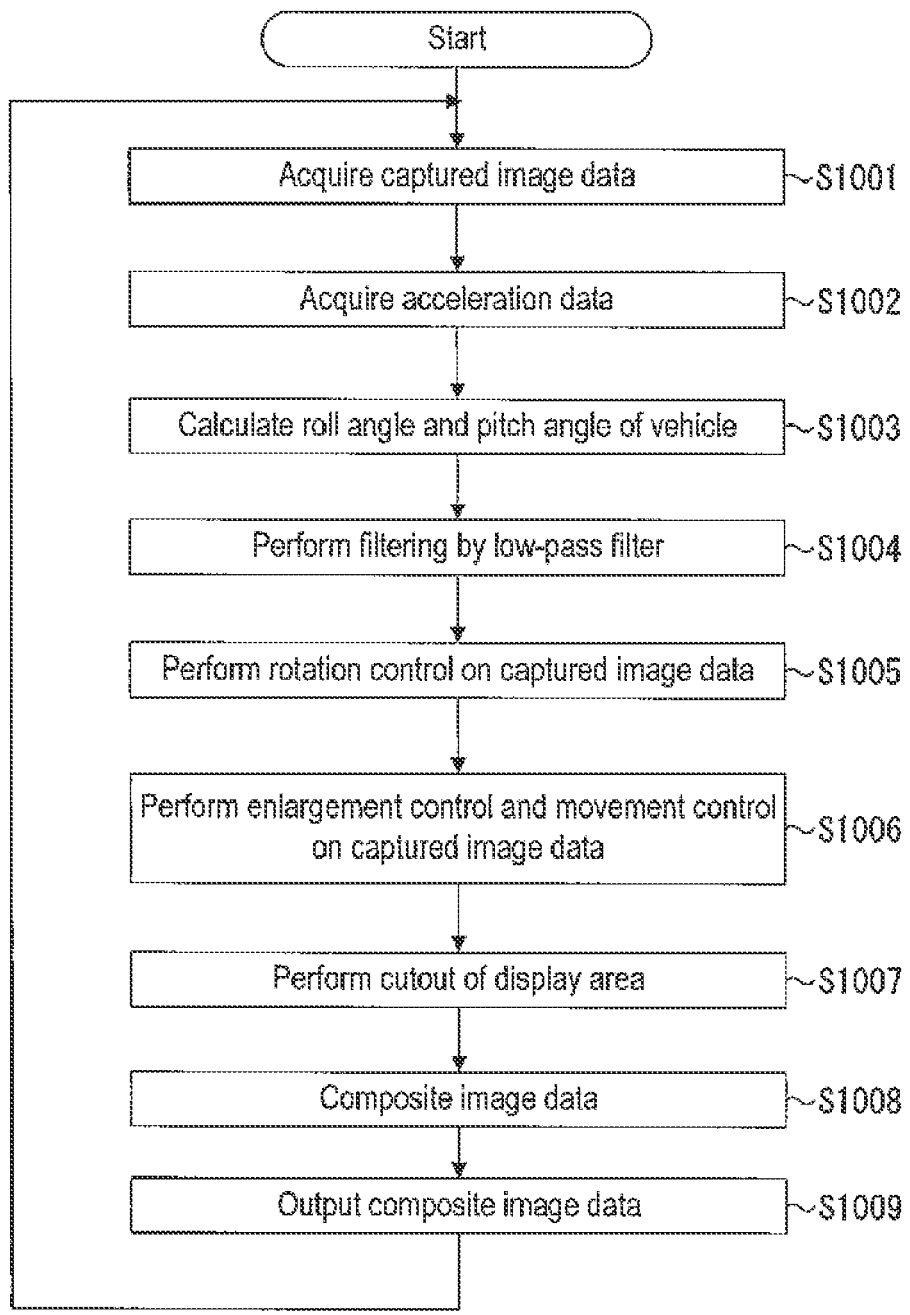

VEHICLE CONTROL APPARATUS AND PROGRAM WITH ROTATIONAL CONTROL OF CAPTURED IMAGE DATA

CROSS REFERENCE TO RELATED APPLICATIONS

This application is a National Stage of International Application No. PCT/JP2014/050387 filed Jan. 10, 2014, claiming priority based on Japanese Patent Application No. 2013-039895 filed Feb. 28, 2013 and Japanese Patent Application No. 2013-062440 filed Mar. 25, 2013, the contents of all of which are incorporated herein by reference in their entirety.

TECHNICAL FIELD

An embodiment of the present invention relates to a vehicle control apparatus and program.

BACKGROUND ART

Conventionally, a technique for providing a vehicle driver with image data captured as surrounding environments of a vehicle by plural cameras which are installed at the vehicle is known as a technique for assisting a parking of the vehicle. A technique for correcting the captured image data depending on an operation of the vehicle in a case where the image data is provided to the driver is proposed. In addition, in order to easily recognize the surrounding environments, a technique for generating bird's eye view image data indicating a ground around the vehicle in an overhead view is proposed.

DOCUMENT OF PRIOR ART

Patent Documents

Patent document 1: JP2009-212703A
Patent document 2: JP09-52555A
Patent document 3: JP2003-009141A
Patent document 4: JP2003-244688A

OVERVIEW OF INVENTION

Problem to be Solved by Invention

Nevertheless, in the conventional art, an issue that the image data is not corrected on a real-time basis is raised because the image data is corrected only when an instruction is made by the driver, for example, or an issue that an appropriate display of the image data is not sufficiently made is raised because an inclination of the vehicle is detected by a vehicle height sensor, the inclination of the vehicle is not accurately obtained in a case where wheels are not in contact with the ground, for example. In addition, an issue that it is difficult to accurately grasp a state around the vehicle by the display based on such the image data is raised.

Means for Solving Problem

A vehicle control apparatus according to embodiments of the present invention, as an example, includes an acquisition portion acquiring captured image data output from an imaging portion that is provided at a vehicle and that images a surrounding of the vehicle, and vehicle state data output from a vehicle state detection portion provided at the vehicle, and a control portion performing a rotation control on the captured image data based on an inclination in a left-right direction of the vehicle relative to a horizontal direction which serves as a direction included in a horizontal plane orthogonal to a direction of gravity, the inclination in the left-right direction of the vehicle being calculated from the vehicle state data, the control portion performing the rotation control in a manner that a horizontal line included in a subject captured in the captured image data is substantially parallel to a lateral-direction side at a display region serving as an output destination. Accordingly, as an example, an effect that it is easy to grasp a state around the vehicle on a basis of the captured image data is obtained.

In addition, in the aforementioned vehicle control apparatus, as an example, the vehicle state detection portion acquires acceleration data serving as the vehicle state data and output from an acceleration detection portion provided at the vehicle, and the control portion performs the rotation control on the captured image data depending on a roll angle indicating an inclination around a front-rear axis of the vehicle obtained from the acceleration data with an origin at a position coordinate within the display region of the captured image data, the position coordinate corresponding to a center of a lens used for imaging by the imaging portion. Accordingly, as an example, an effect that it is easy to grasp the state around the vehicle on a basis of the captured image data is obtained. In addition, an effect that a height difference is easily visually recognizable is obtained.

Further, in the aforementioned vehicle control apparatus, as an example, the control portion further performs an enlargement processing or a reduction processing on the captured image data. Accordingly, as an example, the captured image data is enlarged or reduced depending on the output destination, which obtains an effect where visibility improves.

Furthermore, in the aforementioned vehicle control apparatus, as an example, the control portion further moves the position coordinate corresponding to the center of the lens from a center of the display region relative to the captured image data. Accordingly, as an example, the movement control of the captured image data is performed depending on the output destination, which obtains an effect where visibility improves.

Furthermore, in the aforementioned vehicle control apparatus, as an example, the control portion further moves the position coordinate corresponding to the center of the lens from the center of the display region to an upper direction within the display region. Accordingly, as an example, because a lower region than the horizontal line included in the captured image data is displayed, an effect that the state around the vehicle may be easily grasped is obtained.

Furthermore, in the aforementioned vehicle control apparatus, as an example, the captured image data is displayed at a display device, the display device displaying information that represents at least one of a roll angle indicating an inclination around a front-rear axis of the vehicle and a pitch angle indicating an inclination around a left-right axis of the vehicle together with the captured image data. Accordingly, as an example, an effect that it is easy to grasp both the vehicle state and the state around the vehicle is obtained.

Furthermore, in the aforementioned vehicle control apparatus, as an example, the acquisition portion further acquires information indicating whether or not the vehicle is switched to a mode for off-road, and the control portion performs the rotation control on the captured image data depending on the vehicle state data in a case where the vehicle is switched to the mode for off-road. Accordingly, as an example, an effect that the state around the vehicle is visually recognizable in the mode for off-road is obtained.

Furthermore, the aforementioned vehicle control apparatus, as an example, further includes a generation portion generating bird's eye view image data indicating a ground in a surrounding of the vehicle in an overhead view based on the captured image data on which the rotation control is performed by the control portion. Accordingly, as an example, the surroundings of the vehicle are recognizable in the overhead view by referring to the bird's eye view image data on which a change of point of view is performed after the rotation control for leveling is conducted, which obtains an effect that the state around the vehicle is visually recognizable.

Furthermore, a program according to the embodiments of the present invention, as an example, is configured to cause a computer to execute an acquisition step acquiring captured image data output from an imaging portion that is provided at a vehicle and that images a surrounding of the vehicle, and vehicle state data output from a vehicle state detection portion provided at the vehicle and a control step performing a rotation control on the captured image data based on an inclination in a left-right direction of the vehicle relative to a horizontal direction which serves as a direction included in a horizontal plane orthogonal to a direction of gravity, the inclination in the left-right direction of the vehicle being calculated from the vehicle state data, the control step performing the rotation control in a manner that a horizontal line included in a subject captured in the captured image data is substantially parallel to a lateral-direction side at a display region serving as an output destination. Accordingly, as an example, an effect that it is easy to grasp the state around the vehicle on a basis of the captured image data is obtained.

The aforementioned program, as an example, is further configured to cause the computer to execute a generation step generating bird's eye view image data indicating a ground in a surrounding of the vehicle in the overhead view based on the captured image data on which the rotation control is performed by the control portion. As an example, the bird's eye view image data on which a change of point of view is performed after the rotation control for leveling is conducted is generated. As a result, because the surroundings of the vehicle are recognizable in the overhead view, an effect where the state around the vehicle is visually recognizable is obtained.

BRIEF DESCRIPTION OF DRAWINGS

FIG. 10 is a flowchart illustrating procedures of a display processing on a display device in a surroundings monitoring portion according to the first embodiment;

MODE FOR CARRYING OUT THE INVENTION

Figure 1:
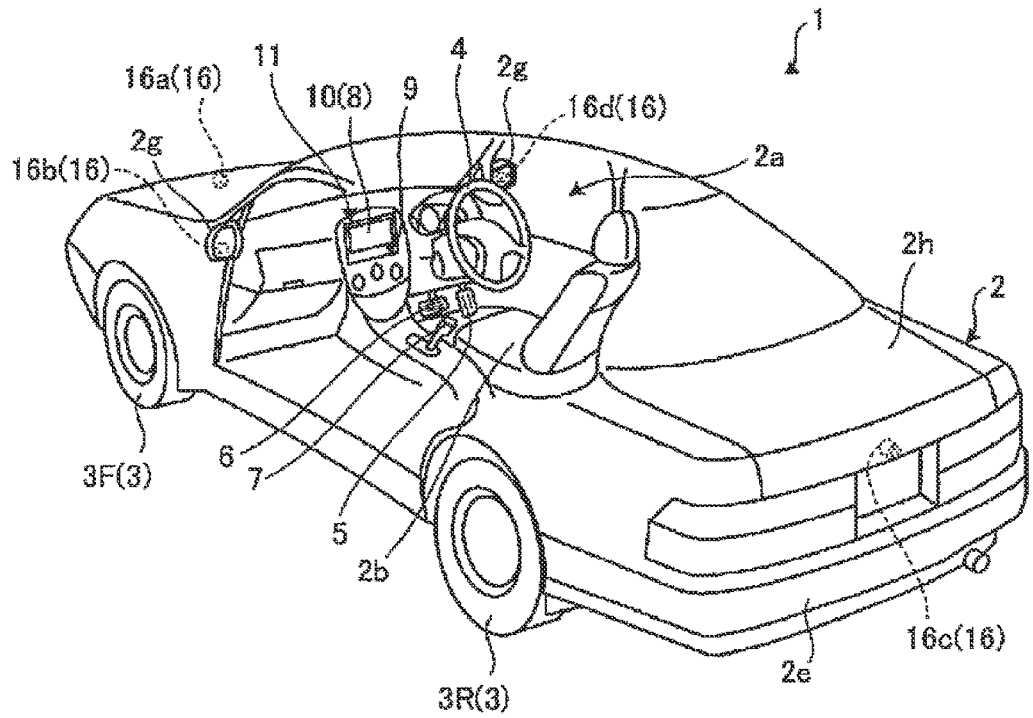
FIG. 1 is a perspective view illustrating an example of a state where a portion of an interior of a vehicle according to embodiments is viewed in a perspective manner.

The following plural embodiments include the similar components to one another. Thus, the similar components bear the common reference numerals. In addition, duplicated explanation is omitted.

First Embodiment

In the embodiment, a vehicle 1 may be a car (internal combustion car) including an internal combustion engine (an engine not illustrated) as a driving source, a car (an electric car, a fuel cell car, or the like) including an electric motor (a motor not illustrated) as the driving source, or a car (a hybrid car) including the engine and the motor as the driving sources, for example. In addition, the vehicle 1 may include various kinds of transmissions and various kinds of apparatuses (systems, parts and the like) necessary for driving the internal combustion engine or the electric motor. Further, method, quantity, layout and the like of an apparatus related to driving of wheels 3 of the vehicle 1 may be variously specified.

As illustrated in FIG. 1, a vehicle body 2 forms a vehicle interior 2a where a passenger (not illustrated) gets in. A steering portion 4, an acceleration operating portion 5, a braking operating portion 6, a speed change operating portion 7 and the like are provided within the vehicle interior 2a in a state facing a seat 2b of a driver as the passenger. In the present embodiment, as an example, the steering portion 4 is a steering wheel projecting from a dashboard (instrument panel) and the acceleration operating portion 5 is an accelerator pedal positioned at the feet of the driver. The braking operating portion 6 is a brake pedal positioned at the feet of the driver and the speed change operating portion 7 is a shift lever projecting from a center console. Nevertheless, the steering portion 4, the acceleration operating portion 5, the braking operating portion 6 and the speed change operating portion 7 are not limited to the aforementioned members.

In addition, a display device 8 (display output portion) and an audio output device 9 (audio output portion) are provided within the vehicle interior 2a. The display device 8 is, for example, a LCD (liquid crystal display), an OELD (organic electroluminescent display) and the like. The audio output device 9 is, as an example, a speaker. In the present embodiment, the display device 8 is covered by a clear operation input portion 10 (for example, a touch panel and the like), for example. The passenger and the like may visually confirm a projected image (image) on a display screen of the display device 8 via the operation input portion 10. The passenger and the like may perform an operation input (instruction input) by operating the operation input portion 10, i.e., touching, pressing or moving the operation input portion 10 with one's finger at a position corresponding to the projected image (image) displayed on the display screen of the display device 8. In the present embodiment, as an example, the display device 8, the audio output device 9, the operation input portion 10 and the like are provided at a monitor device 11 positioned at a center portion of the dashboard in a vehicle width direction (left-right direction). The monitor device 11 may include an operation input portion (not illustrated) such as a switch, a dial, a joy-stick and a pressing button, for example. An audio output device (not illustrated) may be provided at other position within the vehicle interior 2a, i.e., position different from the monitor device 11. In addition, sound may be output from other audio output device than the audio output device 9 of the monitor device 11. In the present embodiment, as an example, the monitor device 11 is shared by a navigation system and an audio system. Alternatively, a monitor device of a surroundings monitoring apparatus may be separately provided from the aforementioned systems. It may be configured that, in addition to the audio output device 9, a warning sound and the like may be output from an audio output portion such as a buzzer 24 (refer to FIG. 3), for example.

Figure 2:
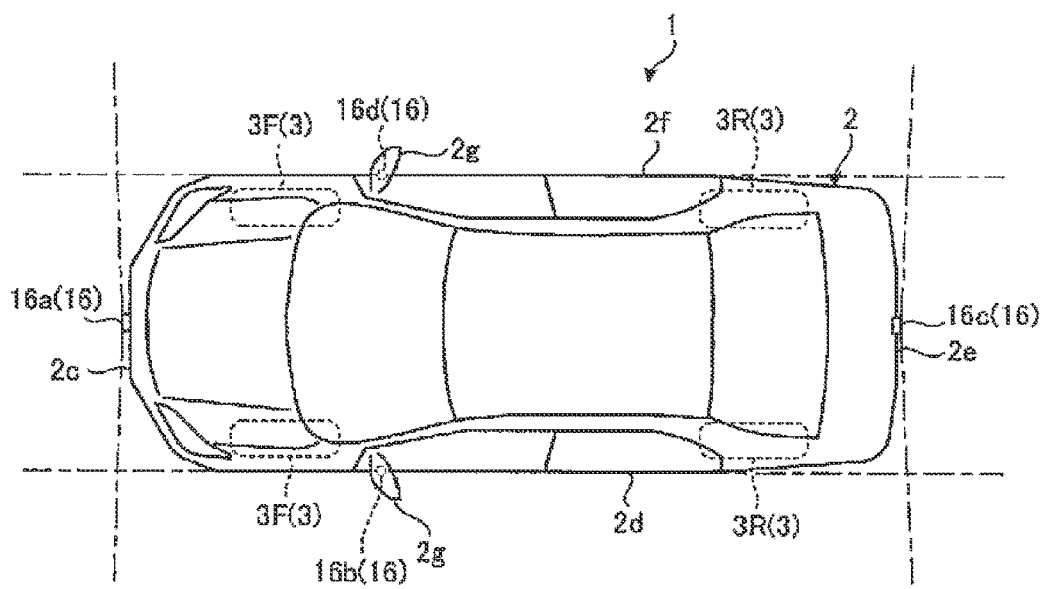
FIG. 2 is a plan view (bird's eye view) illustrating an example of the vehicle according to the embodiments.
Figure 3:
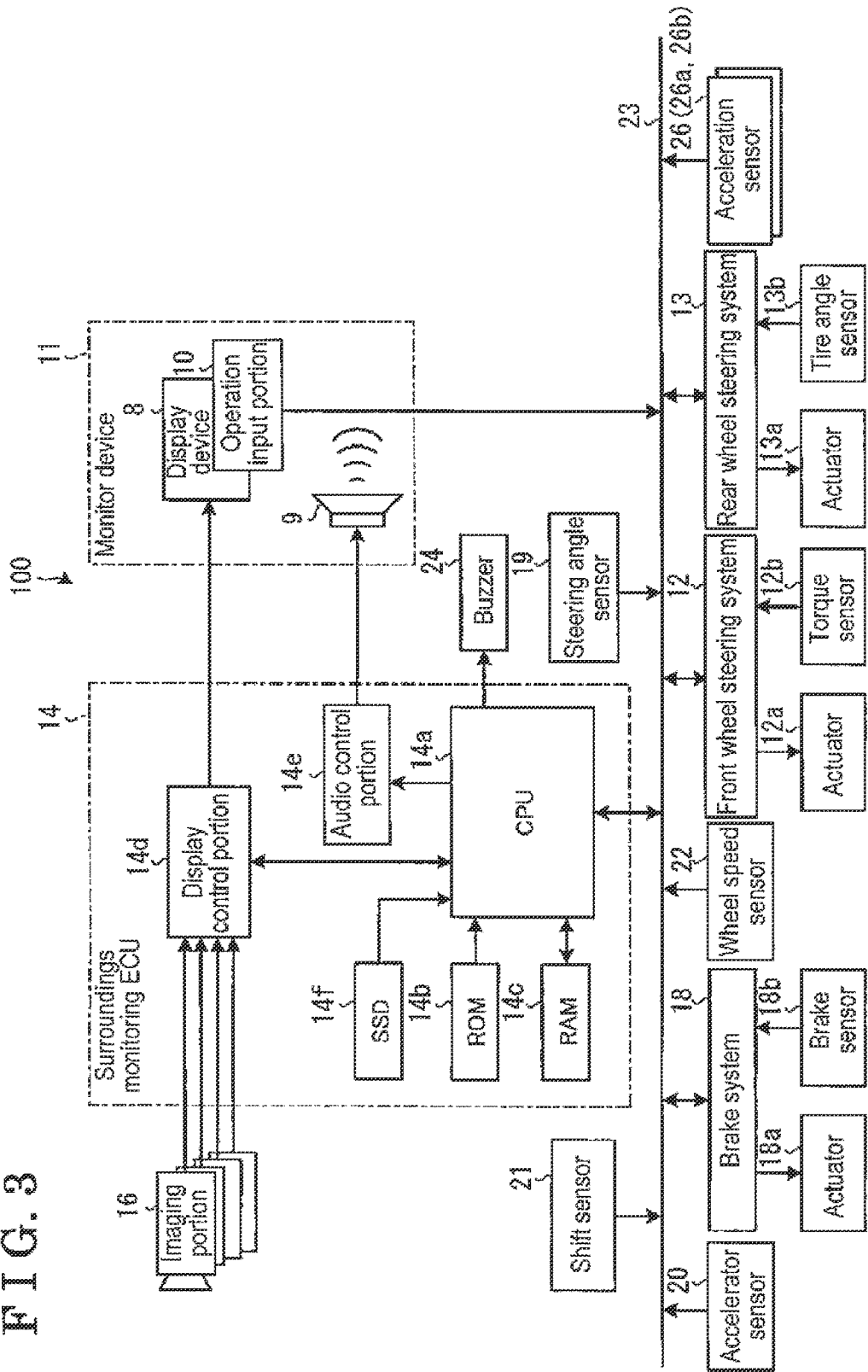
FIG. 3 is a block diagram illustrating an example of a surroundings monitoring system of the vehicle according to the embodiments.

As illustrated in FIGS. 1 and 2, in the present embodiment, the vehicle 1 is a four-wheel vehicle (four-wheel car) as an example. The vehicle 1 includes two right and left front wheels 3F and two right and left rear wheels 3R. Further, in the present embodiment, these four wheels 3 are configured to be steered (capable of being steered). Specifically, as illustrated in FIG. 3, the vehicle 1 includes a front wheel steering system 12 steering the front wheels 3F and a rear wheel steering system 13 steering the rear wheels 3R. The front wheel steering system 12 and the rear wheel steering system 13 are electrically controlled by a surroundings monitoring ECU 14 (electronic control unit) and the like to operate respective actuators 12a and 13a. Each of the front wheel steering system 12 and the rear wheel steering system 13 is, for example, an electric power steering system, an SBW (steer by wire) system, and the like. The front wheel steering system 12 and the rear wheel steering system 13 assist a steering force by adding torque (assist torque) to the steering portion 4 by the actuators 12a and 13a, and steer the corresponding wheels 3 (the front wheels 3F or the rear wheels 3R), for example. Each of the actuators 12a and 13a may steer one of or more than one of the wheels 3. In the present embodiment, as an example, the two front wheels 3F are steered substantially parallel to each other at the same phases (same phases, same steering directions, same rotation directions) and the two rear wheels 3R are steered substantially parallel to each other at the same phases. The driving wheels may be variously specified.

In the present embodiment, as an example, plural (in the embodiment, four, as an example) imaging portions 16 (16a-16d) are provided at the vehicle 1 (vehicle body 2) as illustrated in FIG. 2. Each of the imaging portions 16 is, for example, a digital camera incorporating an imaging element such as a CCD (charge coupled device), a CIS (CMOS image sensor) and the like. The imaging portions 16 may output image data (moving image data, frame data) at a predetermined frame rate. Each of the imaging portions 16 includes a wide-angle lens to thereby take a picture in a range from 140° to 220° in a horizontal direction (view angle). An optical axis of the imaging portion 16 is specified to face downward (obliquely downward). Thus, the imaging portion 16 takes a picture of outside environment around the vehicle body 2 including a road surface on which the vehicle 1 is movable.

In the above, the horizontal direction is a direction included in a horizontal plane orthogonal to a direction of gravity (vertical direction).

In the embodiment, as an example, the imaging portion 16a is positioned at an end portion 2c (an end portion in a plan view) at a front side (a front side in a vehicle front-rear direction) of the vehicle body 2 and is provided at a front bumper, for example. The imaging portion 16b is positioned at an end portion 2d at a left side (a left side in a vehicle width direction) of the vehicle body 2 and is provided at a door mirror 2g (projecting portion) at a left side. The imaging portion 16c is positioned at an end portion 2e at a rear side (a rear side in the vehicle front-rear direction) of the vehicle body 2 and is provided at a wall portion at a lower side of a door 2h of a rear trunk. The imaging portion 16d is positioned at an end portion 2f at a right side (a right side in the vehicle width direction) of the vehicle body 2 and is provided at a door mirror 2g (projecting portion) at a right side. In the present embodiment, the method of mounting the camera at the vehicle is not limited and the camera may be mounted so that the image data in a front direction, the image data in right and left side directions and the image data in a rear direction relative to the vehicle is obtainable.

The surroundings monitoring ECU 14 performs a calculation processing and an image processing based on the image data obtained by the plural imaging portions 16. The surroundings monitoring ECU 14 is able to generate a wider view angle image and a virtual bird's eye view image (planar image) where the vehicle 1 (vehicle body 2) is viewed from an upper side.

In the present embodiment, as an example, in a surroundings monitoring system 100 as illustrated in FIG. 3, a brake system 18, a steering angle sensor 19 (angular sensor), an accelerator sensor 20, a shift sensor 21, a wheel speed sensor 22, an acceleration sensor 26, and the like are electrically connected, in addition to the surroundings monitoring ECU 14, the monitor device 11, the front wheel steering system 12, the rear wheel steering system 13, and the like, via an in-vehicle network 23 (electric telecommunication line). The in-vehicle network 23 is configured as a CAN (controller area network) as an example. The surroundings monitoring ECU 14 may send a control signal via the in-vehicle network 23 to control the front wheel steering system 12, the rear wheel steering system 13, the brake system 18, and the like. The surroundings monitoring ECU 14 may also receive detection results of a torque sensor 12b, a tire angle sensor 13b (for the rear wheels 3R), an actuator 18a, a brake sensor 18b, the steering angle sensor 19 (for the front wheels 3F), the accelerator sensor 20, the shift sensor 21, the wheel speed sensor 22, the acceleration sensor 26, and the like and indicator signals (control signals, operation signals, input signals, data) of the operation input portion 10 and the like via the in-vehicle network 23.

In the present embodiment, the two acceleration sensors 26 (26a, 26b) are provided at the vehicle 1. In the embodiment, the vehicle 1 is equipped with an ESC (electronic stability control). Then, the acceleration sensors 26 (26a, 26b) as conventionally mounted to the vehicle equipped with the ESC (electronic stability control) are employed. In the present embodiment, no restriction is made on the acceleration sensor. The sensor that is able to detect the acceleration in the left-right direction of the vehicle 1 is acceptable.

Figure 4:
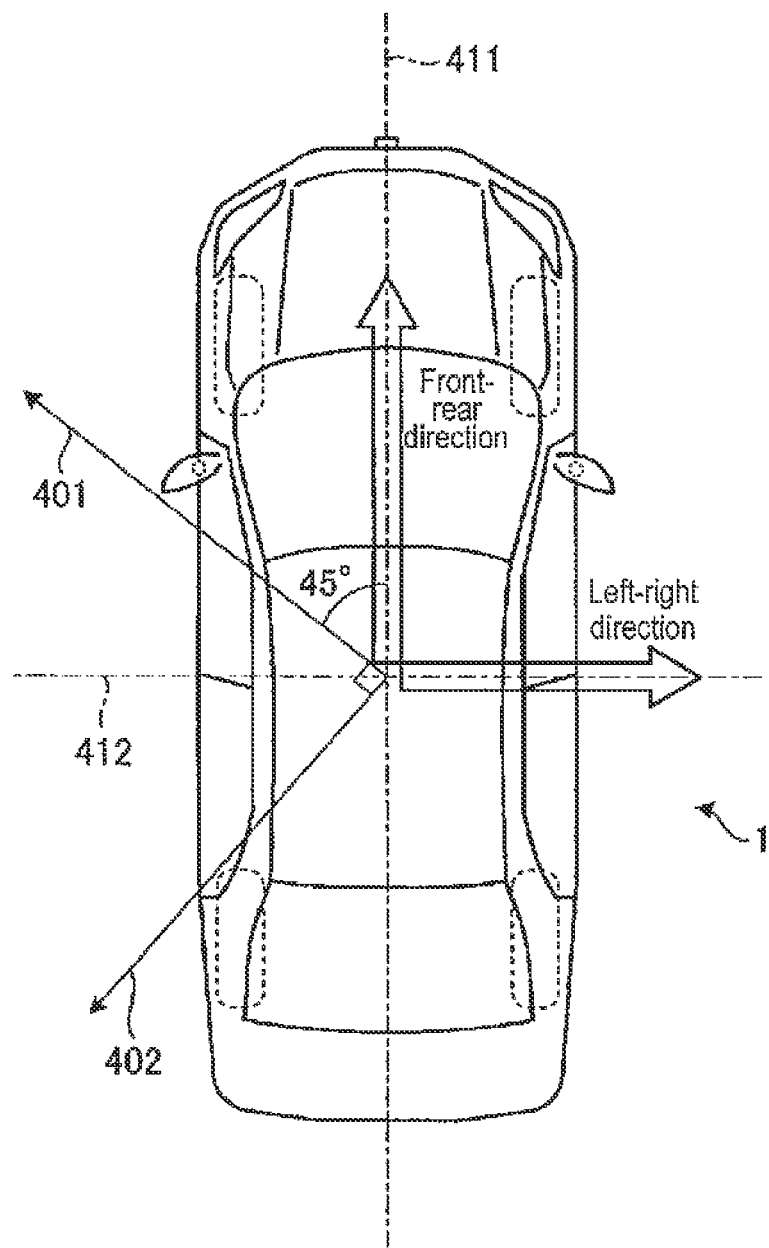
FIG. 4 is a diagram illustrating an example of a detection direction of an acceleration sensor according to the embodiments.

FIG. 4 is a diagram illustrating an example of detection directions of the acceleration sensors 26a, 26b. A detection direction 401 is the detection direction of the acceleration sensor 26a while a detection direction 402 is the detection direction of the acceleration sensor 26b. The detection direction 401 illustrated in FIG. 4 corresponds to a direction inclined by 45 degrees from a travelling direction (front-rear direction) of the vehicle 1 on a plane in parallel with a ground (a plane on which the vehicle 1 is movable). The detection direction 402 forms an angle of 90 degrees relative to the detection direction 401 on the plane in parallel with the ground. Because the two different detection directions are provided on the plane in parallel with the ground, the acceleration in the front-rear direction and the acceleration in the left-right direction may be obtained. In the present embodiment, no restriction is made on the detection direction and at least the acceleration in the left-right direction may be obtained. Calculations of the acceleration in the front-rear direction and the acceleration in the left-right direction are made at the surroundings monitoring ECU 14.

The front-rear direction of the vehicle 1 indicates the travelling direction and an opposite direction from the travelling direction of the vehicle 1. The left-right direction of the vehicle 1 is a direction included in a surface orthogonal to the travelling direction of the vehicle 1.

Back to FIG. 3, the surroundings monitoring ECU 14 includes, as an example, a CPU 14a (central processing unit), a ROM 14b (read only memory), a RAM 14c (random access memory), a display control portion 14d, an audio control portion 14e, a SSD 14f (solid state drive, flush memory), and the like. The CPU 14a performs the image processing related to the image displayed at the display device 8 and the various calculation processing such as calculation of a moving path of the vehicle 1 and determination of whether or not interference with an object occurs, for example. The CPU 14a reads out program stored (installed) at a nonvolatile memory device such as the ROM 14b, for example, and performs the calculation processing based on the aforementioned program.

The RAM 14c tentatively stores various data used for the calculations at the CPU 14a. The display control portion 14d mainly performs the image processing using the image data obtained at the imaging portions 16 and the image processing (composition and the like, as an example) of the image data displayed at the display device 8, for example, within the calculation processing at the surroundings monitoring ECU 14. In addition, the audio control portion 14e mainly performs processing of audio data output at the audio output device 9 within the calculation processing at the surroundings monitoring ECU 14. The SSD 14f is a rewritable nonvolatile memory portion that is able to store data even in a case where a power source of the surroundings monitoring ECU 14 is turned off. The CPU 14a, the ROM 14b, the RAM 14c and the like may be integrated within the same package. The surroundings monitoring ECU 14 may be configured to include other logic operation processor such as a DSP (digital signal processor) or a logic circuit, for example, than the CPU 14a. In addition, instead of the SSD 14f, a HDD (hard disk drive) may be provided. Further, the SSD 14f or the HDD may be provided separately from the surroundings monitoring ECU 14.

Figure 5:
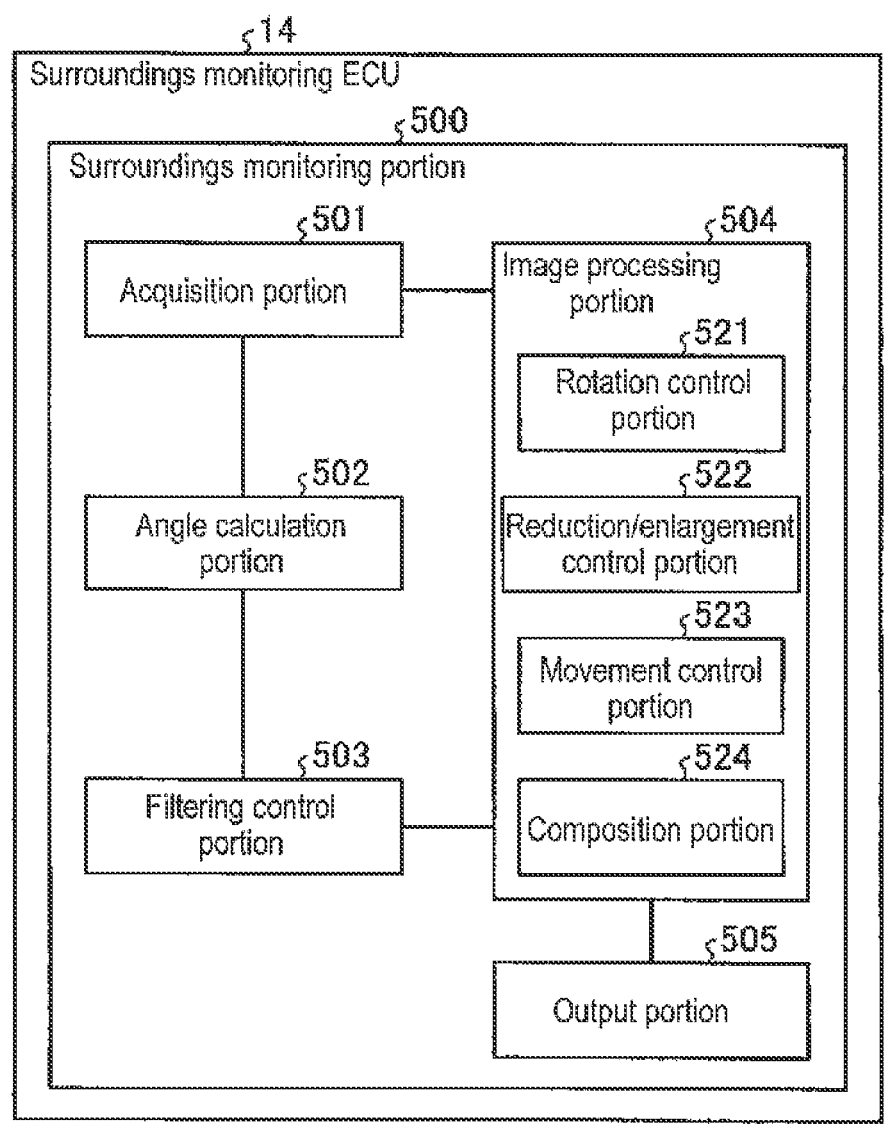
FIG. 5 is a block diagram illustrating a construction of a surroundings monitoring portion realized within a surroundings monitoring ECU according to the first embodiment.

FIG. 5 is a block diagram illustrating a construction of a surroundings monitoring portion 500 realized within the surroundings monitoring ECU 14 according to the present embodiment. Each construction within the surroundings monitoring portion 500 illustrated in FIG. 5 is realized in a case where the CPU 14a configured as the surroundings monitoring ECU 14 in FIG. 4 performs software stored within the ROM 14b.

The surroundings monitoring portion 500 realizes an acquisition portion 501, an angle calculation portion 502, a filtering control portion 503, an image processing portion 504 and an output portion 505 by performing software stored within the ROM 14b (computer readable storage medium). At this time, software (program) may be provided via other computer readable storage medium.

Then, the surroundings monitoring portion 500 according to the present embodiment assists the driving of the driver by displaying the image data by which a state around the vehicle 1 is recognizable on the basis of the captured image data input from the imaging portions 16 in a case where the vehicle 1 moves to be parked, and the acceleration data as an example of a vehicle state data acquired by the acceleration sensor 26 (acceleration detection portion) functioning as an example of a vehicle state detection portion.

The acquisition portion 501 acquires various pieces of information from various sensors, for example, provided at the vehicle 1. The acquisition portion 501 according to the present embodiment acquires the captured image data output from the imaging portions 16a to 16d provided at the vehicle 1 to capture the images in the surroundings of the vehicle 1 and the acceleration data output from the acceleration sensors 26a, 26b provided at the vehicle 1. Further, the acquisition portion 501 acquires information indicating whether or not a mode specified by a switch provided at the operation input portion 10 is an off-road mode. The acquisition portion 501 outputs the acquired information to the angle calculation portion 502 and the image processing portion 504.

The acquisition portion 501 also correlates the captured image data with the acceleration data where time when the image is captured in the captured image data and time when the acceleration is detected in the acceleration data substantially match each other.

The angle calculation portion 502 calculates an inclination angle (a pitch angle and a roll angle) of the vehicle 1 based on the acceleration data acquired by the acceleration sensors 26a, 26b. Here, the pitch angle is an angle indicating an inclination of the vehicle 1 around a left-right axis (axis 412 in FIG. 4) of the vehicle 1. In a case where the vehicle 1 is present on the horizontal plane (ground), the pitch angle is zero degrees.

The roll angle is an angle indicating an inclination of the vehicle 1 around a longitudinal axis (axis 411 in FIG. 4) of the vehicle 1. In a case where the vehicle 1 is present on the horizontal plane (ground), the roll angle is zero degrees. In order to calculate the pitch angle and the roll angle, the angle calculation portion 502 first calculates an acceleration a1 in the front-rear direction and an acceleration a2 in the left-right direction of the vehicle 1.

The angle calculation portion 502 calculates the acceleration a1 in the front-rear direction using the following equation (1). The acceleration in the detection direction 401 is specified to be GL1 and the acceleration in the detection direction 402 is specified to be GL2. In the present embodiment, as an example, the acceleration a1 in the front-rear direction turns to 0 G in a case where the pitch angle is 0° (in a case where the vehicle 1 is horizontal) and the acceleration a1 in the front-rear direction turns to 1 G in a case where the pitch angle is 90° (in a case where the vehicle 1 is vertical).

$$a1 = GL1 \times \cos 45° - GL2 \times \cos 45° \quad (1)$$

Next, the angle calculation portion 502 calculates the acceleration a2 in the left-right direction using the following equation (2).

$$a2 = -(GL1 \times \sin 45° + GL2 \times \sin 45°) \quad (2)$$

Further, the angle calculation portion 502 calculates a pitch angle PA using the following equation (3).

$$PA[deg] = 90[deg] \times a1[G] \quad (3)$$

Further, the angle calculation portion 502 calculates a roll angle RA using the following equation (4).

$$RA[deg] = 90[deg] \times a1[G] \quad (4)$$

The angle calculation portion 502 correlates the roll angle and the pitch angle calculated from the acceleration data with the captured image data that is correlated to the aforementioned acceleration data. Accordingly, the roll angle and the pitch angle of the vehicle 1 when the captured image data is captured are recognizable.

The filtering control portion 503 performs filtering by low-pass filter relative to the roll angle RA and the pitch angle PA calculated by the angle calculation portion 502.

In the present embodiment, steep changes of the roll angle RA and the pitch angle PA, in other words, a steep switching of the image data displayed at the display device 8 is restrained by performing the low-pass filter. Accordingly, the driver may comfortably watch the image data displayed at the display device 8. In the present embodiment, an example where digital filter is used by the filtering control portion 503 provided within the surroundings monitoring portion 500 is explained. Nevertheless, for example, analog filter, for example, may be performed relative to a signal output from the acceleration sensor 26.

The image processing portion 504 includes a rotation control portion 521, a reduction/enlargement control portion 522, a movement control portion 523 and a composition portion 524 to generate the image data displayed at the display device 8.

The rotation control portion 521 performs a rotation correction on the captured image data capturing the surroundings of a front side of the vehicle 1. A subject of the rotation correction is not limited to the captured image data captured by the imaging portion 16a and may be the captured image data captured by the imaging portion 16c capturing the surroundings of a rear side of the vehicle 1, for example.

Figure 6:
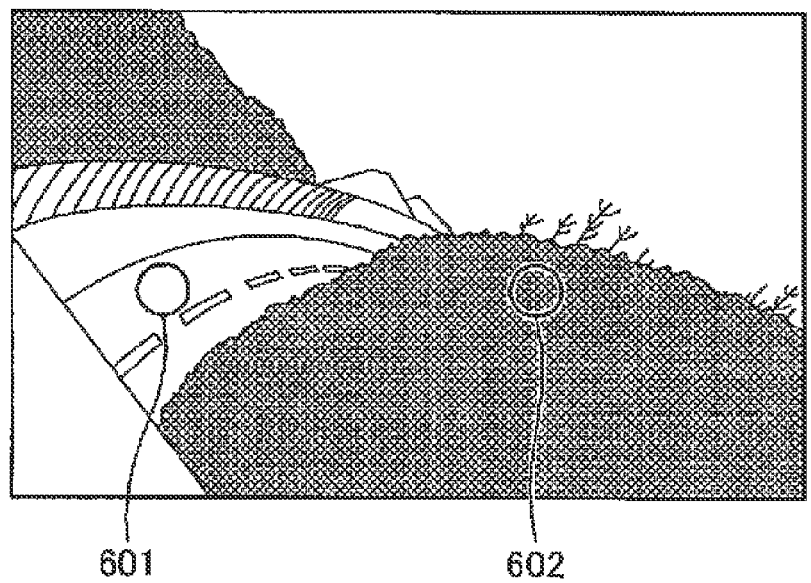
FIG. 6 is an example of captured image data captured by an imaging portion according to the first embodiment.

FIG. 6 is an example of the captured image data captured by the imaging portion 16a. The captured image data illustrated in FIG. 6 is captured from the vehicle 1 that is inclined. The driver tends to recognize the image displayed at the display device 8 in an objective way and thus tends to recognize areas in the captured image data displayed at the display device 8, if the areas include the same heights in a vertical axis direction, include the same heights in reality or heights with a smaller height difference than the actual height difference. In the example illustrated in FIG. 6, a region 601 and a region 602 are possibly recognized as the same heights.

Thus, the rotation control portion 521 according to the present embodiment performs the rotation correction on the captured image data depending on the roll angle obtained by the acceleration sensors 26. In other words, the rotation control portion 521 performs the rotation correction (control) on the captured image data based on the inclination of the vehicle in the left-right direction relative to the horizontal direction serving as the direction included in the horizontal plane orthogonal to the direction of gravity calculated from the vehicle state data. For example, the rotation control portion 521 performs the rotation correction (control) so that a horizontal line included in a subject captured in the captured image data is substantially parallel to a lateral-direction side at a display region of an output destination.

The rotation control portion 521 according to the present embodiment performs the rotation correction with an origin at a position coordinate within the display region of the captured image data corresponding to a center of a lens used by the imaging portion 16 for image capturing depending on the roll angle correlated to the aforementioned captured image data.

Figure 7:
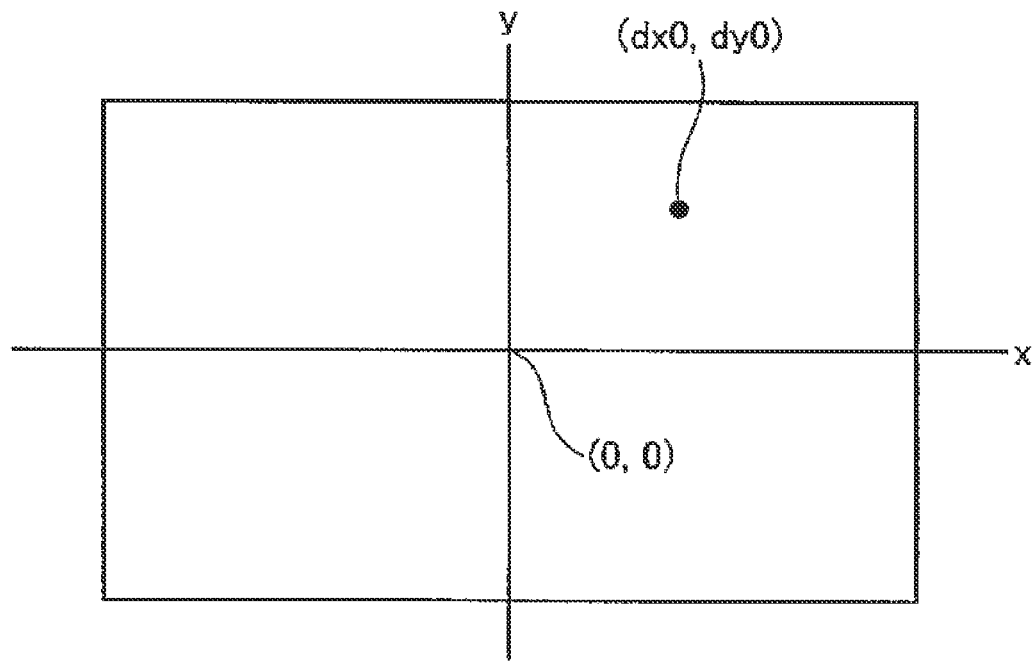
FIG. 7 is a diagram illustrating an example of a two-dimensional orthogonal coordinate system that indicates a display region of the captured image data in a case where a position coordinate corresponding to a center of a lens serves as an origin.

FIG. 7 is a diagram illustrating an example of a two-dimensional orthogonal coordinate system that indicates the display region of the captured image data in a case where the position coordinate corresponding to the center of the lens serves as the origin. For each position coordinate included in the coordinate system illustrated in FIG. 7, the rotation control portion 521 converts the position coordinate by an equation (5) indicated below so as to achieve the rotation correction of the captured image data. Here, dx0, dy0 is a coordinate value with the origin at the center of the lens. In addition, θ is the roll angle that is calculated.

[Mathematical 1]

$$\begin{pmatrix} dx1 \\ dy1 \end{pmatrix} = \begin{pmatrix} \cos\theta & \sin\theta \\ -\sin\theta & \cos\theta \end{pmatrix} \begin{pmatrix} dx0 \\ dy0 \end{pmatrix} \quad (5)$$

Figure 8:
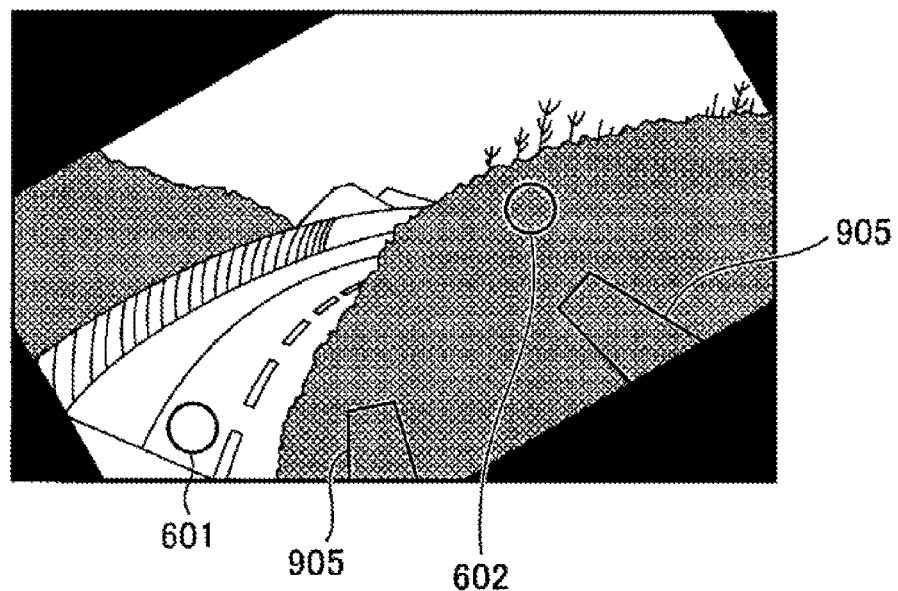
FIG. 8 is a diagram illustrating an example of the captured image data after a rotation correction is performed by a rotation control portion according to the first embodiment.

FIG. 8 is a diagram illustrating an example of the captured image data obtained after the rotation correction is performed by the rotation control portion 521. In the example illustrated in FIG. 8, the rotation correction is performed so that the horizontal line included in the subject (environment outside the vehicle 1) captured in the captured image data is substantially in parallel with the lateral-direction side of the display region of the display device 8. In other words, the rotation correction is performed so that a lower direction of the captured image data corresponds to the direction of gravity of the subject (environment outside the vehicle 1) captured in the aforementioned captured image data. At this time, the lower direction and the direction of gravity do not necessarily completely coincide with each other and may coincide with each other so that a height relation within the captured image data is recognizable.

For example, as for the region 601 and the region 602 which seem to include the same heights in FIG. 6, it is recognizable in FIG. 8 that the region 602 is present at a higher position than the region 601. Therefore, the driver may recognize an objective height in the surrounding environments of the vehicle 1. Accordingly, an appropriate driving is achievable, which may improve safety.

The reduction/enlargement control portion 522 functioning as the control portion performs an enlargement processing or a reduction processing relative to the captured image data after the rotation correction is performed by the rotation control portion 521. The reduction/enlargement control portion 522 converts the position coordinate by an equation (6) indicated below to achieve an enlargement correction or a reduction correction of the captured image data. Here, dx1, dy1 is a coordinate value with the origin at the center of the lens after the rotation correction is performed. Here, magX and magY are horizontal and vertical enlargement/reduction rates. The enlargement/reduction rate is decided on a basis of a relationship between a display size of the captured image data and number of pixels of the display region of the display device 8.

[Mathematical 2]

$$\begin{pmatrix} dx2 \\ dy2 \end{pmatrix} = (magX \quad magY) \begin{pmatrix} dx1 \\ dy1 \end{pmatrix} \quad (6)$$

The movement control portion 523 functioning as the control portion performs a control on the captured image data after the enlargement or reduction processing is performed by the reduction/enlargement control portion 522 so that the position coordinate corresponding to the center of the lens moves from the center of the display region of the display device 8. In the present embodiment, the movement control portion 523 performs a control to move the position coordinate corresponding to the center of the lens from the center of the display region of the display device 8 to an upper direction within the display region.

That is, in a situation where the vehicle 1 is inclined, the driver tends to desire to confirm the ground conditions. Thus, the movement control portion 523 performs the processing to move the position coordinate corresponding to the center of the lens from the center of the display region of the display device 8 to the upper direction within the display region. Accordingly, conditions upper than the vehicle 1 such as the sky captured in the captured image data, for example, are not displayed and conditions lower than the vehicle 1 are displayed. Thus, the user may recognize the ground conditions around the vehicle 1 by referring to the captured image data displayed at the display device 8. Accordingly, an appropriate steering assist is achievable.

The movement control portion 523 converts the position coordinate by an equation (7) indicated below to achieve the movement of the position coordinate of the captured image data. Here, dx2, dy2 is a coordinate value with the origin at the center of the lens after the enlargement/reduction correction is performed. Here, a destination of the position coordinate of the center of the lens before the movement is (cx, cy).

[Mathematical 3]

$$\begin{pmatrix} dx3 \\ dy3 \end{pmatrix} = \begin{pmatrix} dx2 + cx \\ dy2 + cy \end{pmatrix} \quad (7)$$

The composition portion 524 performs a cutout relative to the captured image data after the movement control is performed by the movement control portion 523 so as to conform to the display region of the display device 8 and thereafter combines display information for assisting the steering of the driver.

Figure 9:
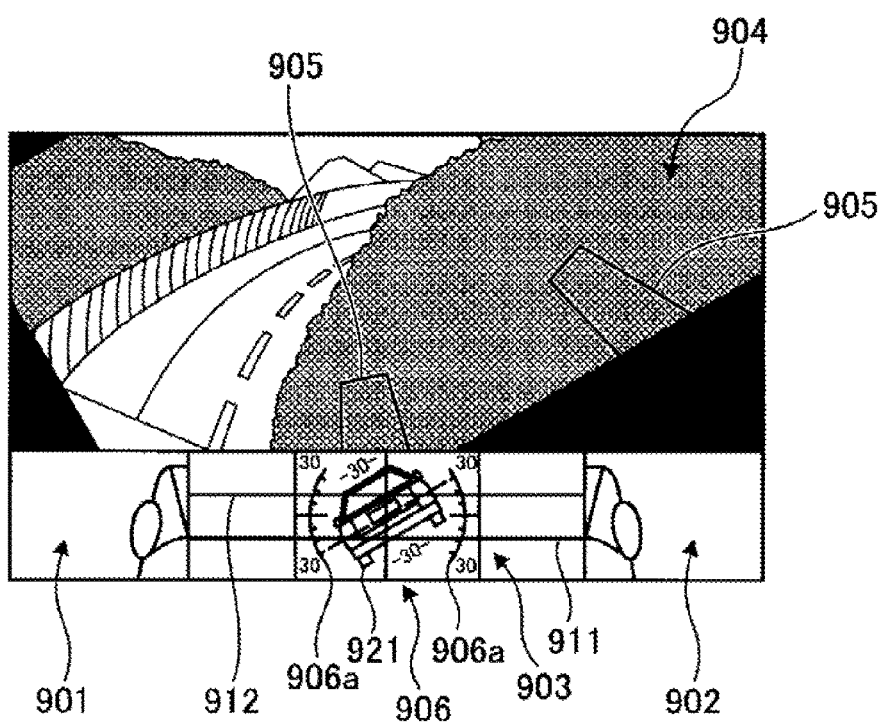
FIG. 9 is a diagram illustrating an example of image data after a composition portion performs composition according to the first embodiment.

FIG. 9 is a diagram illustrating an example of the image data after the composition is performed by the composition portion 524. In the example illustrated in FIG. 9, conditions around the left front wheel of the vehicle 1 captured by the imaging portion 16b is displayed at a display region 901. In addition, conditions around the right front wheel of the vehicle 1 captured by the imaging portion 16d is displayed at a display region 902. Further, information by which the pitch angle and the roll angle of the vehicle 1 are recognizable is displayed at a display region 903. That is, an inclination of an icon 921 representing the vehicle 1 indicates the roll angle while a distance between a center line 912 passing through the icon 921 and a line 911 indicates the pitch angle. Accordingly, in the present embodiment, information by which the roll angle and the pitch angle are recognizable is indicated, however, display method is not limited to the above and other display method is acceptable.

In the vehicle 1 according to the present embodiment, the roll state and the pitch state of the vehicle 1 during the off-road driving may be displayed in real time. Accordingly, the driver may easily and objectively recognize the conditions of the surroundings of the vehicle 1.

In addition, the captured image data after cut out by the composition portion 524 is displayed at a display region 904. The horizontal line within the image in the captured image data is corrected to be substantially in parallel with a lateral frame of the display device 8. In other words, the lower direction of the image in the captured image data is corrected to match the direction of gravity. Accordingly, the driver may easily recognize the surrounding state.

Then, the output portion 505 outputs the image data that is composited by the composition portion 524 to the display device 8. Accordingly, together with the aforementioned captured image data after the correction processing is performed, information by which the roll angle and the pitch angle are recognizable is displayed at the display device 8.

In the example of FIG. 8 or 9, an estimated course line 905 of each of the front wheels 3F is included. The surroundings monitoring ECU 14 (CPU 14a) is able to calculate a planned course based on detection results of the steering angle sensor 19 and the tire angle sensor 13b, for example, and to include (overlap) the estimated course line 905 conforming to the planned course in the output image. The estimated course line 905 is an example of a display element indicating the course that is planned. The surroundings monitoring ECU 14 corrects the display position, size, posture (inclination) and the like of the estimated course line 905 depending on the aforementioned rotation, enlargement/reduction and movement corrections. In addition, in a case where the position of the estimated course line 905 is greatly deviated from a center of the screen, the surroundings monitoring ECU 14 is able to correct the display region and the estimated course line 905 in a direction where the deviation is reduced.

In the example of FIG. 9, the inclination of the icon 921 relative to a lateral-direction side of the display region 903 or 904 (an upper side or a lower side in FIG. 9) corresponds to the roll angle of the vehicle 1. Thus, the surroundings monitoring ECU 14 may constitute a tiltmeter 906 (roll angle display portion) using the icon 921 by including an angle scale 906a (tilt scale) surrounding the icon 921 in the output image in a manner that an angle of the angle scale 906a remains unchanged relative to the display region 903. For example, only by the display of the display region 904, it may be difficult to understand the horizontal direction, the vertical direction, and the posture (the roll angle or the pitch angle) of the vehicle 1. In this point, as in the example of FIG. 9, the icon 921 that performs rotation (rolling) and pitching is displayed and the tiltmeter 906 is displayed on the screen depending on the roll angle and the pitch angle so that the horizontal direction, the vertical direction and the posture (the roll angle) of the vehicle 1 may be easily understood, regardless of the state of the image of the display region 904. Accordingly, the display region 904 and the display region 903 are displayed together (displayed within the same screen or displayed in parallel with each other) so that the state around the vehicle and the state of the posture of the vehicle may be further easily understood.

In addition, the present embodiment may not perform the aforementioned rotation, enlargement/reduction and movement corrections on a constant basis and may be specified to perform the aforementioned corrections in a case where the vehicle 1 is brought to the off-road mode. For example, the image processing portion 504 performs the aforementioned rotation, enlargement/reduction and movement corrections at the time of the off-road mode by referring to information acquired by the acquisition portion 501 indicating whether or not the vehicle 1 is in the off-road mode.

Here, the off-road mode corresponds to the mode for bringing out a four-wheel driving performance of the vehicle 1 during the off-road driving and the mode for specifying a total transfer gear to be low. That is, in the present embodiment, the captured image data displayed at the display device 8 is switched in association with the operation when the off-road driving is performed. At this time, in the present embodiment, the switching of the image displayed at the display device 8 is not limited to be performed in a case where the vehicle 1 is switched to the off-road mode. For example, in a case where the vehicle 1 is switched to the four-wheel driving in a two/four wheel drive switching, it may be controlled that the image after the rotation correction is performed is displayed.

Next, a display processing at the display device 8 in the surroundings monitoring portion 500 according to the present embodiment is explained. FIG. 10 is a flowchart illustrating procedures of the aforementioned processing in the surroundings monitoring portion 500 according to the present embodiment.

First, the acquisition portion 501 acquires the captured image data from the imaging portions 16 (step S1001). Next, the acquisition portion 501 acquires the acceleration data from the acceleration sensors 26 (step S1002).

Then, the angle calculation portion 502 calculates the roll angle and the pitch angle of the vehicle 1 from the acceleration data (step S1003).

Next, the filtering control portion 503 performs filtering by low-pass filter relative to the calculated roll angle and the calculated pitch angle (step S1004).

Then, the rotation control portion 521 performs the rotation control relative to the captured image data depending on the roll angle (step S1005).

Next, the reduction/enlargement control portion 522 and the movement control portion 523 perform the enlargement control and the movement control on the captured image data after the rotation control is performed (step S1006).

Then, the composition portion 524 performs the cutout conforming to the display region displayed at the display device 8 relative to the captured image data after the enlargement control and the movement control are performed (step S1007).

Next, the composition portion 524 combines the captured image data indicating the state around the front wheels and the display information by which the pitch angle and the roll angle are recognizable relative to the captured image data that is cut out (step S1008).

Then, the output portion 505 outputs the image data after the composition by the composition portion 524 to the display device 8 (step S1009).

The surroundings monitoring portion 500 according to the present embodiment includes the aforementioned construction so as to easily recognize the difference in height in the surroundings of the vehicle 1. Accordingly, load of steering may be reduced to thereby improve safety.

Second Embodiment

Figures 11, 12:
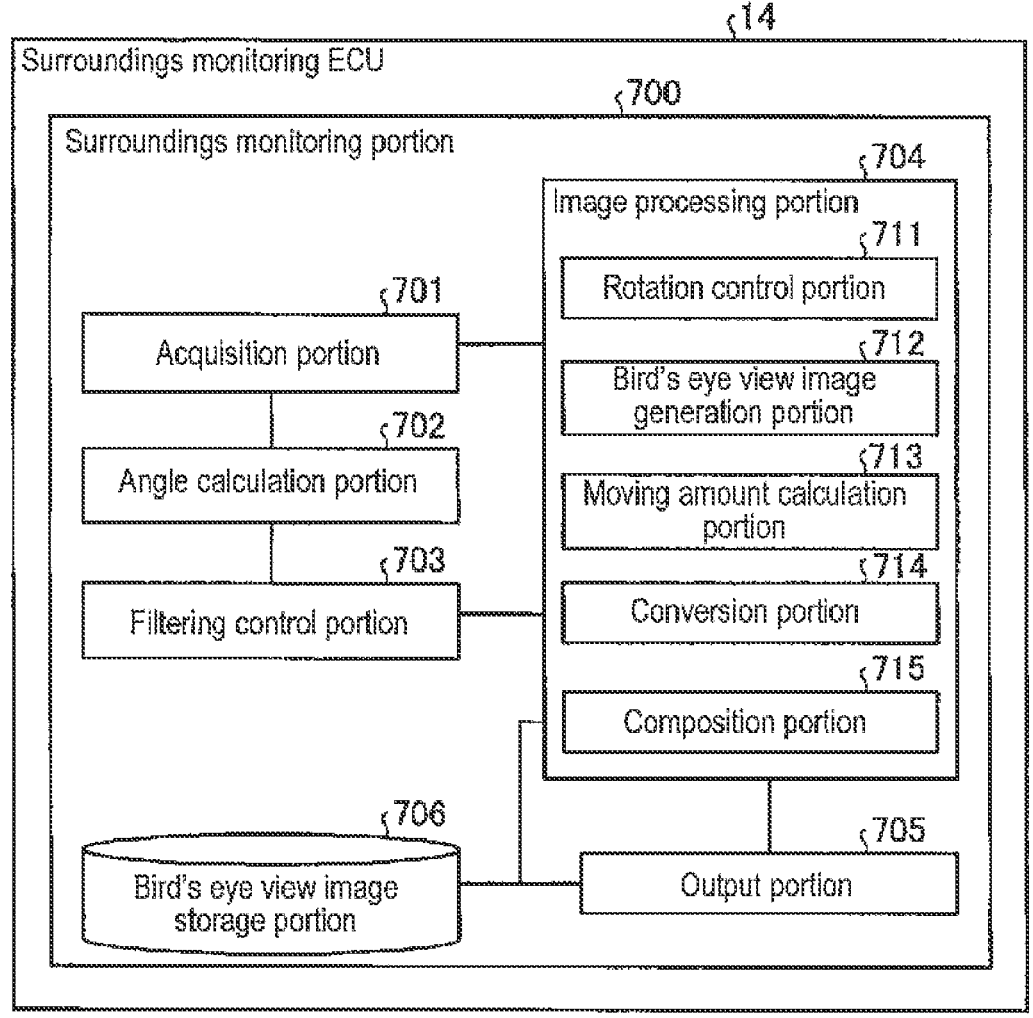
FIG. 11 is a block diagram illustrating a construction of a surroundings monitoring portion realized within a surroundings monitoring ECU according to the second embodiment.
FIG. 12 is a diagram illustrating an example of a state where a vehicle rides on a stone, for example, during an off-road driving of the vehicle according to the second embodiment.

FIG. 11 is a block diagram illustrating a construction of a surroundings monitoring portion 700 realized within the surroundings monitoring ECU 14 according to the present embodiment. The CPU 14a configured as the surroundings monitoring ECU 14 in FIG. 4 executes software stored within the ROM 14b to thereby realize an acquisition portion 701, an angle calculation portion 702, a filtering control portion 703, an image processing portion 704 and an output portion 705 illustrated in FIG. 11. In addition, the surroundings monitoring portion 700 realizes a bird's eye view image storage portion 706 on the RAM 14c.

The acquisition portion 701 acquires various pieces of information from various sensors, for example, provided at the vehicle 1. The acquisition portion 701 according to the present embodiment acquires the captured image data output from the imaging portions 16a to 16d provided at the vehicle 1 to capture the images in the surroundings of the vehicle 1 and the acceleration data serving as an example of the vehicle state data output from the acceleration sensors 26a, 26b (acceleration detection portion) provided at the vehicle 1 and functioning as an example of the vehicle state detection portion. The acquisition portion 701 outputs the acquired information to the angle calculation portion 702 and the image processing portion 704.

The acquisition portion 701 also correlates the captured image data with the acceleration data where time when the image is captured in the captured image data and time when the acceleration is detected in the acceleration data substantially match each other.

The angle calculation portion 702 calculates the inclination angle (the pitch angle and the roll angle) of the vehicle 1 based on the acceleration data acquired by the acceleration sensors 26a, 26b. Here, the pitch angle is an angle indicating an inclination of the vehicle 1 around the left-right axis (axis 412 in FIG. 4) of the vehicle. In a case where the vehicle 1 is present on the horizontal plane (ground), the pitch angle is zero degrees.

The roll angle is an angle indicating an inclination of the vehicle 1 around the longitudinal axis (axis 411 in FIG. 4) of the vehicle 1. In a case where the vehicle 1 is present on the horizontal plane (ground), the roll angle is zero degrees. In order to calculate the pitch angle and the roll angle, the angle calculation portion 702 first calculates the acceleration a1 in the front-rear direction and the acceleration a2 in the left-right direction of the vehicle 1.

The angle calculation portion 702 calculates the acceleration a1 in the front-rear direction using the following equation (1). The acceleration in the detection direction 401 is specified to be GL1 and the acceleration in the detection direction 402 is specified to be GL2. In the present embodiment, as an example, the acceleration a1 in the front-rear direction turns to 0 G in a case where the pitch angle is 0° (in a case where the vehicle 1 is horizontal) and the acceleration a1 in the front-rear direction turns to 1 G in a case where the pitch angle is 90° (in a case where the vehicle 1 is vertical).

$$a1 = GL1 \times \cos 45° - GL2 \times \cos 45° \quad (1)$$

Next, the angle calculation portion 702 calculates the acceleration a2 in the left-right direction using the following equation (2).

$$a2 = -(GL1 \times \sin 45° + GL2x)\sin 45° \quad (2)$$

Further, the angle calculation portion 702 calculates the pitch angle PA using the following equation (3).

$$PA[deg] = 90[deg] \times a1[G] \quad (3)$$

Further, the angle calculation portion 702 calculates the roll angle RA using the following equation (4).

$$RA[deg] = 90[deg] \times a2[G] \quad (4)$$

The angle calculation portion 702 correlates the roll angle and the pitch angle calculated from the acceleration data with the captured image data that is correlated to the aforementioned acceleration data. Accordingly, the roll angle and the pitch angle of the vehicle 1 when the captured image data is captured are recognizable.

The filtering control portion 703 performs filtering by low-pass filter relative to the roll angle RA and the pitch angle PA calculated by the angle calculation portion 702.

In the present embodiment, steep changes of the roll angle RA and the pitch angle PA, in other words, a steep switching of the image data displayed at the display device 8 is restrained by performing the low-pass filter. Accordingly, the driver may comfortably watch the image data displayed at the display device 8. In the present embodiment, an example where digital filter is used by the filtering control portion 703 provided within the surroundings monitoring portion 700 is explained. Nevertheless, for example, analog filter, for example, may be performed relative to a signal output from the acceleration sensor 26.

The image processing portion 704 includes a rotation control portion 711, a bird's eye view image generation portion 712 (generation portion), a moving amount calculation portion 713, a conversion portion 714 and a composition portion 715 each of which serves as the control portion. The image processing portion 704 generates the image data to be displayed at the display device 8.

The rotation control portion 711 performs the rotation correction on the captured image data capturing the surroundings of a front side of the vehicle 1 (travelling direction) based on the inclination of the vehicle in the left-right direction relative to the horizontal direction calculated from the vehicle state data (in other words, depending on the roll angle). The horizontal direction is a direction orthogonal to the travelling direction, for example. In addition, the rotation correction may be performed on the captured image data in the same direction as a rotation direction where the vehicle becomes horizontal based on the inclination in the left-right direction of the vehicle calculated from the vehicle state data. In other words, the aforementioned rotation correction may be performed on the captured image data as if the image is captured in a state where the left-right direction of the vehicle 1 is horizontal (in a state where the vehicle 1 is arranged on the horizontal plane orthogonal to the direction of gravity). In the present embodiment, as an example, the acceleration is used as the vehicle state data. The vehicle state data, however, is not limited to the acceleration and may be information relevant to the state of the vehicle 1. A subject of the rotation correction is not limited to the captured image data captured by the imaging portion 16a and may be the captured image data captured by the imaging portion 16c that captures the surroundings of a rear side of the vehicle 1.

FIG. 12 is a diagram illustrating an example of a state where the vehicle 1 drives over a stone, for example, during the off-road driving. In the sample illustrated in FIG. 12, because the vehicle 1 drives over the stone, for example, the vehicle 1 is inclined by a roll angle θ. In a case where bird's eye view image data is generated from the captured image data captured by the imaging portion 16a in the aforementioned state, distortion depending on the roll angle θ occurs.

Therefore, the rotation control portion 711 according to the present embodiment performs the rotation correction on the captured image data depending on the roll angle θ obtained from the acceleration sensor 26.

The rotation control portion 711 according to the present embodiment performs the rotation correction with the origin at the position coordinate within the display region of the captured image data corresponding to the center of the lens used by the imaging portion 16a for image capturing depending on the roll angle correlated to the captured image data.

Figure 13:
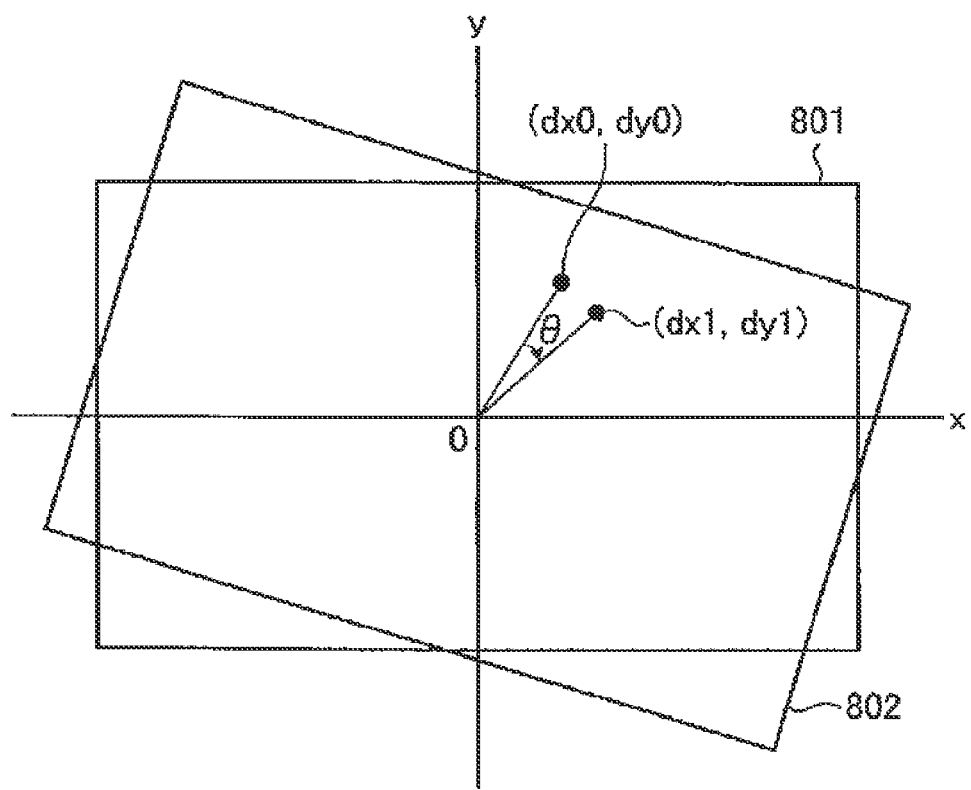
FIG. 13 is a diagram illustrating an example of a two-dimensional orthogonal coordinate system that indicates a display region of captured image data in a case where a position coordinate corresponding to a center of a lens serves as an origin.

FIG. 13 is a diagram illustrating an example of a two-dimensional orthogonal coordinate system that indicates the display region of the captured image data in a case where the position coordinate corresponding to the center of the lens serves as the origin. For each position coordinate included in the coordinate system illustrated in FIG. 13, the rotation control portion 711 converts the position coordinate by the equation (5) indicated below so as to achieve the rotation correction of the captured image data. Here, dx0, dy0 is a coordinate value with the origin at the center of the lens. In addition, the angle θ illustrated in FIG. 13 is the roll angle that is calculated.

[Mathematical 4]

$$\begin{pmatrix} dx1 \\ dy1 \end{pmatrix} = \begin{pmatrix} \cos\theta & \sin\theta \\ -\sin\theta & \cos\theta \end{pmatrix} \begin{pmatrix} dx0 \\ dy0 \end{pmatrix} \quad (5)$$

The rotation control portion 711 performs the rotation correction on all pixels included in a display region 801 so as to generate a display region 802 obtained by the rotation of the display region 801 by the angle θ. Then, the surroundings monitoring portion 700 generates the bird's eye view image data based on the captured image data including the display region 802 which is obtained after the rotation control is performed. Accordingly, the bird's eye view image data where the inclination caused by the roll angle θ generated at the vehicle 1 is corrected may be generated.

In addition, the rotation control portion 711 according to the present embodiment does not limit the angle for the rotation control on the captured image data to the roll angle by which the vehicle 1 is inclined from the horizontal plane. The rotation control portion 711 may perform the rotation control on the captured image data depending on a difference between the roll angle previously calculated and the roll angle presently calculated. This is because the state of the ground around the vehicle 1 when the vehicle 1 is driven on the ground that is inclined by a predetermined angle (roll angle previously calculated) is more easily recognizable in a case where the bird's eye view image data is generated from an angle inclined by the predetermined angle from the upper side of the vehicle 1 in the vertical direction than a case where the bird's eye view image data is generated from the upper side of the vehicle 1 in the vertical direction. In the aforementioned case, the rotation control portion 711 performs the rotation control on the captured image data for the difference of the roll angles resulting from the inclination by driving on a stone, for example (difference between the previously calculated roll angle and the presently calculated roll angle), in a case where the vehicle 1 drives on a stone, for example.

The bird's eye view image generation portion 712 generates, on a basis of the captured image data which is obtained after the rotation control is performed, the bird's eye view image data obtained by looking down the ground in the travelling direction of the vehicle 1 serving as the ground around the vehicle 1 from the upper side. Here, any method for generating the bird's eye view image data from the captured image data is acceptable. For example, a mapping table may be used for conversion.

The generation of the bird's eye view image data is performed each time the captured image data is acquired. In other words, the bird's eye view image generation portion 712 generates first bird's eye view image data based on first captured image data on which the rotation control is performed by the rotation control portion 711 and thereafter generates second bird's eye view image data based on second captured image data which is captured by the imaging portions 16 after the first captured image data is captured and then the vehicle 1 moves and on which the rotation control is performed by the rotation control portion 711.

In the present embodiment, the image data displayed at the display device 8 is updated each time the vehicle 1 moves by a predetermined moving amount. Thus, the moving amount calculation portion 713 compares the bird's eye view image data generated by the bird's eye view image generation portion 712 and the bird's eye view image data used upon previous updating so as to calculate the moving amount of the vehicle 1.

Nevertheless, the comparison in the entire bird's eye view image data causes a great processing load. Thus, the moving amount calculation portion 713 according to the present embodiment compares predetermined areas within the bird's eye view image data generated by the bird's eye view image generation portion 712.

Specifically, the moving amount calculation portion 713 according to the present embodiment cuts out the predetermined area (display range) from each of the first bird's eye view image data used upon the previous updating and the second bird's eye view image data generated after the first bird's eye view image data so as to calculate an optical flow.

Figure 14:
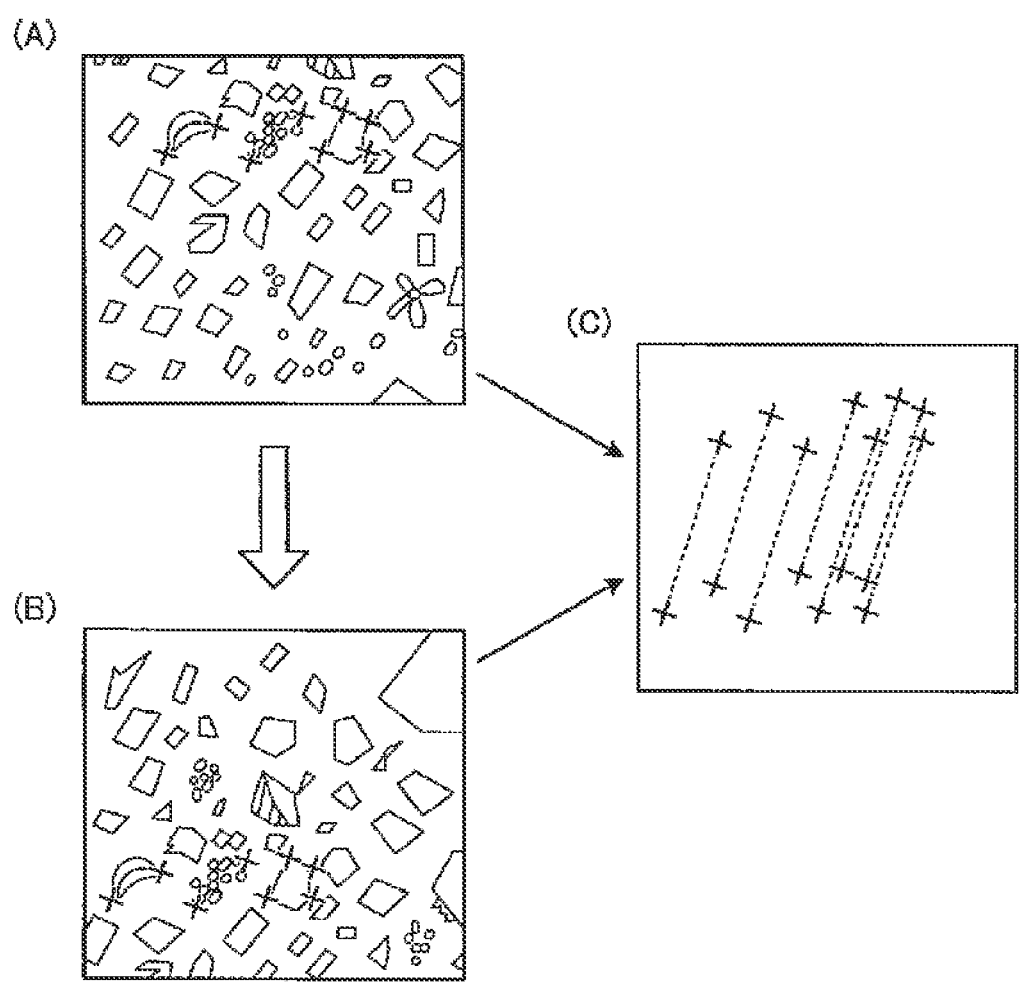
FIG. 14 is a diagram illustrating a concept of optical flow calculated by a moving amount calculation portion according to the second embodiment.

FIG. 14 is a diagram illustrating a concept of optical flow calculated by the moving amount calculation portion 713. (A) of FIG. 14 is the image data cut out at the predetermined display range from the first bird's eye view image data used upon the previous updating while (B) of FIG. 14 is the image data cut out at the predetermined display range from the second bird's eye view image data generated presently by the bird's eye view image generation portion 712.

Then, the moving amount calculation portion 713 calculates the optical flows indicating a shifting of (feature points of) each displayed object by vectors between the image data illustrated in (A) of FIG. 14 and the image data illustrated in (B) of FIG. 14. (C) of FIG. 14 illustrates an example of calculated optical flows. In the example illustrated in (C) of FIG. 14, a length of each vector corresponding to a movement of the feature point (indicated by "X") in (A) of FIG. 14 to the feature point (indicated by "X") in (B) of FIG. 14 is indicated.

Then, the moving amount calculation portion 713 calculates the moving amount of the vehicle 1 from an average value of the calculated optical flows.

Figure 15:
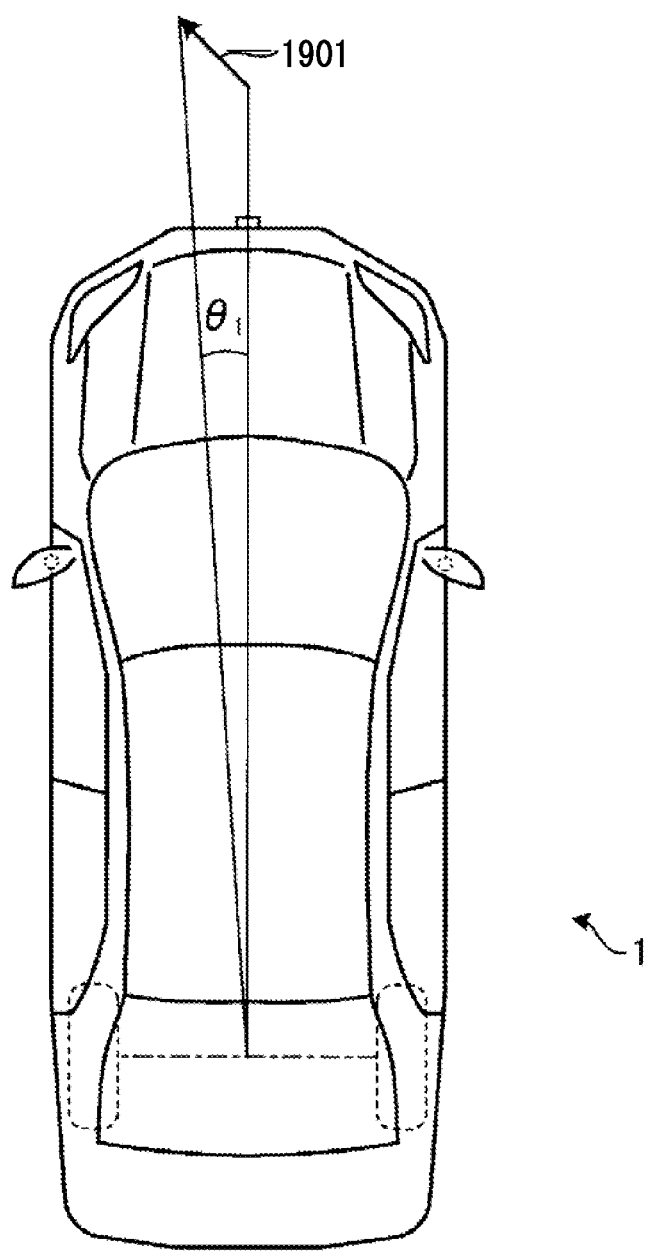
FIG. 15 is a diagram illustrating a relation between an average value of optical flows and a moving amount of the vehicle.

FIG. 15 is a diagram illustrating a relation between the average value of the optical flows and the moving amount of the vehicle 1. In the example illustrated in FIG. 15, an arrow 1901 is specified to be the average value of the optical flows. The vehicle 1 turns about a rear wheel axis. Thus, in a case of the average value 1901 of the optical flows, the vehicle 1 turns by a turning angle 1θ. Accordingly, the moving amount calculation portion 713 calculates the turning angle 1θ of the vehicle 1. Further, the moving amount calculation portion 713 calculates the moving amount of the vehicle 1 from the length of each of the optical flows. The moving amount calculation portion 713 may separately calculate the moving amount of the vehicle 1 in the front-rear direction and the moving amount of the vehicle 1 in the left-right direction.

The conversion portion 714 converts the bird's eye view image data generated presently by the bird's eye view image generation portion 712 into the bird's eye view image data for composition with the bird's eye view image data stored at the bird's eye view image storage portion 706 in a case where the moving amount calculated by the moving amount calculation portion 713 is equal to or greater than a predetermined distance.

In a case where the vehicle 1 is inclined, the inclination is corrected by the rotation control portion 711, however, distortion resulting from the inclination remains in the captured image data captured by the imaging portions 16. Thus, in order to reduce the distortion by the conversion portion 714, a projective transformation is performed on the bird's eye view image data.

In the present embodiment, the projective transformation is employed so that a case where the torsion of the road surface within the captured image data is generated by the inclination of the vehicle 1 is converted to a case where the vehicle 1 is not inclined. For example, a so-called trapezoidal correction where a trapezoidal-shaped area within the captured image data is converted to a rectangular or square area, for example, is included.

Figure 16:
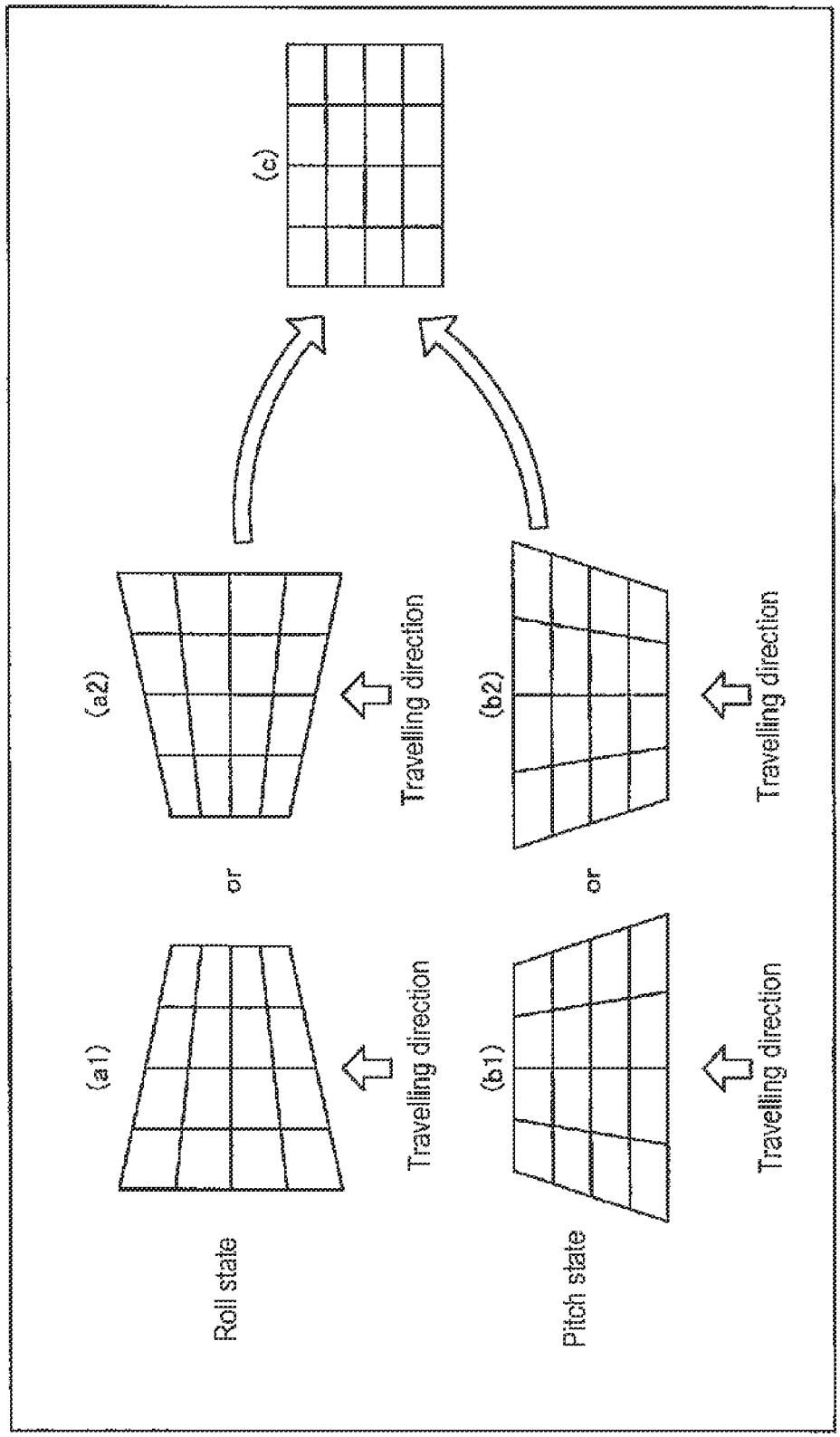
FIG. 16 is a diagram illustrating a torsion of the captured image data caused by an inclination of the vehicle and a display range of the captured image data after a conversion portion performs conversion according to the second embodiment.

FIG. 16 is a diagram illustrating the distortion of the captured image data caused by the inclination of the vehicle 1 and the display range of the captured image data after the conversion is performed by the conversion portion 714. In the example illustrated in FIG. 16, distortion states (a1) and (a2) of the bird's eye view image data generated in a roll state of the vehicle 1 are illustrated and distortion states (b1) and (b2) of the bird's eye view image data generated in a pitch state of the vehicle 1 are illustrated. In a case where the bird's eye view image data in the distorted state because of the inclination of the vehicle 1 is combined with the bird's eye view image data stored at the bird's eye view image storage portion 706, the distortion is accumulated.

Therefore, the conversion portion 714 according to the present embodiment performs the projective transformation determined on a basis of a second roll angle in FIG. 16 relative to the second captured image data cut out at the display range ((a1), (a2), (b1), (b2)) specified on a basis of the aforementioned roll angle obtained from the acceleration data acquired when the captured image data is captured. The display range ((a1), (a2), (b1), (b2)) is converted to the display range illustrated in (c) of FIG. 16. Here, a method for specifying the position coordinates of four points indicating the display region serving as a subject of the projective transformation based on the roll angle may be any method regardless of whether it is a conventional method or not. For example, a correlation of the roll angle θ with each of the four position coordinates may be provided beforehand.

The composition portion 715 combines the bird's eye view image data stored at the bird's eye view image storage portion 706 and the bird's eye view image data obtained after the projective transformation is performed by the conversion portion 714.

Figure 17:
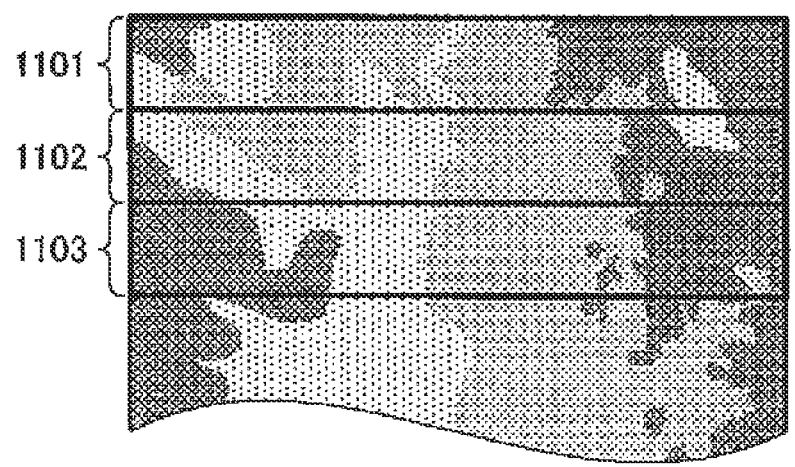
FIG. 17 is a diagram illustrating an example of bird's eye view image data after a composition portion performs composition according to the second embodiment.

FIG. 17 is a diagram illustrating an example of the bird's eye view image data obtained after the composition is performed by the composition portion 715. Within the bird's eye view image data illustrated in FIG. 17, a display range 1101 is a range most recently composited. A display range 1102 is a range composited before the display range 1101. A display range 1103 is a range composited before the display range 1102. Accordingly, in the present embodiment, the bird's eye view image data is composited each time the vehicle 1 moves.

The bird's eye view image storage portion 706 stores the bird's eye view image data after the composition by the composition portion 715. Accordingly, the bird's eye view image storage portion 706 composites and stores the bird's eye view image data newly generated each time the vehicle 1 moves by the predetermined moving amount so that the bird's eye view image data indicating the condition of the ground below the vehicle 1 is stored at the bird's eye view image storage portion 706.

Figure 18:
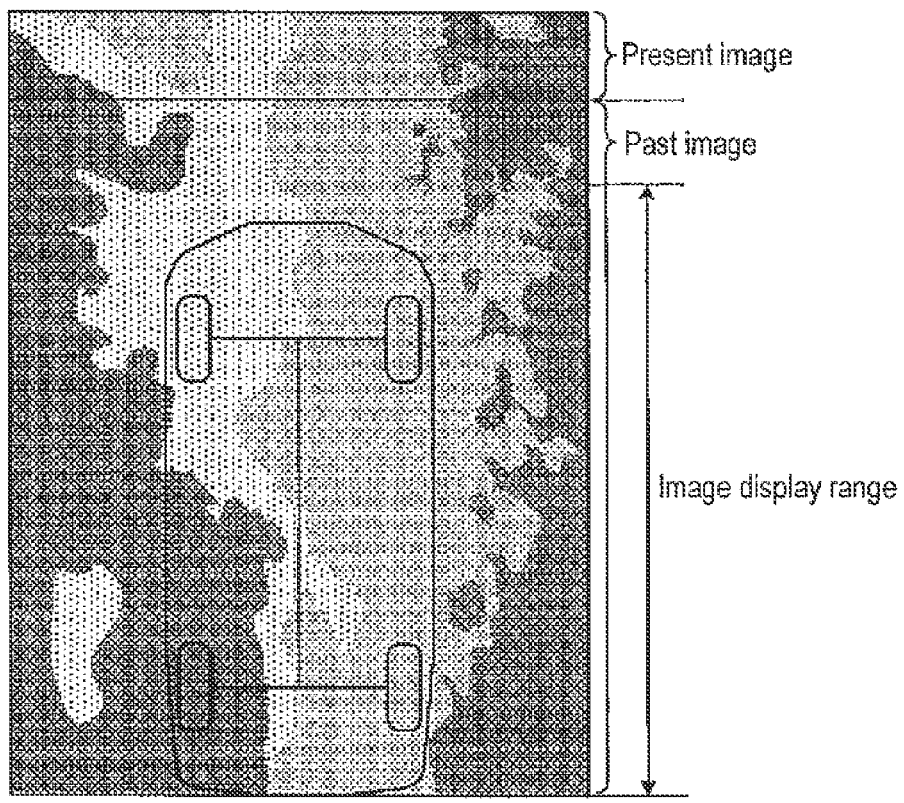
FIG. 18 is a diagram illustrating an example of the bird's eye view image data stored at a bird's eye view image storage portion according to the second embodiment.

FIG. 18 is a diagram illustrating an example of the bird's eye view image data stored at the bird's eye view image storage portion 706. As illustrated in FIG. 18, besides the bird's eye view image data generated from the captured image data presently captured, the bird's eye view image data generated from the captured image data captured up to the previous time is composited and stored. As illustrated in FIG. 18, the bird's eye view image data stored at the bird's eye view image storage portion 706 includes the ground below the vehicle 1. The configuration of the vehicle 1 illustrated in FIG. 18 is indicated for easily explanation and is not included in the actual bird's eye view image data stored at the bird's eye view image storage portion 706.

In addition, in a case where the composition portion 715 combines the bird's eye view image data stored at the bird's eye view image storage portion 706 with the bird's eye view image data obtained after the projective transformation is performed by the conversion portion 714, the composition portion 715 performs a rotation processing with the turning angle 81 on the bird's eye view image data stored at the bird's eye view image storage portion 706 when the vehicle 1 turns at the turning angle θ1. Then, the composition portion 715 performs the composition with the bird's eye view image data obtained after the projective transformation is performed by the conversion portion 714. Accordingly, the bird's eye view image data conforming to the turning of the vehicle 1 may be displayed.

Figure 19:
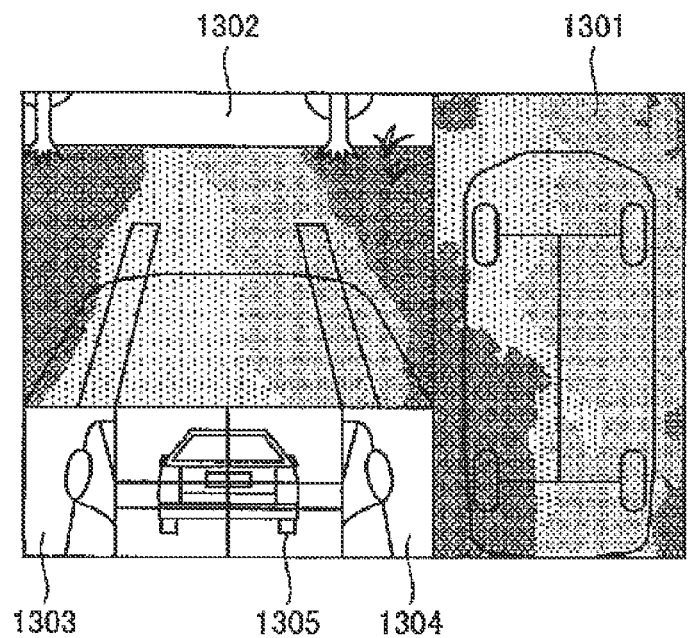
FIG. 19 is a diagram illustrating an example of screen information output by an output portion according to the second embodiment.

The output portion 705 outputs, together with the bird's eye view image data stored at the bird's eye view image storage portion 706, the image data where various pieces of information are composited to the display device 8. FIG. 19 is a diagram illustrating an example of screen information output by the output portion 705. In the example of the screen information illustrated in FIG. 19, captured image data 1302 capturing the travelling direction of the vehicle 1 by the imaging portion 16a, captured image data 1303 around the front left wheel of the vehicle 1 captured by the imaging portion 16b, and captured image data 1304 around the front right wheel of the vehicle 1 captured by the imaging portion 16d are displayed in addition to bird's eye view image data 1301. Further, in a display region 1305, the pitch angle and the roll angle of the vehicle 1 are displayed as recognizable information. That is, while the roll angle is indicated by an inclination of an icon, the pitch angle is indicated by a distance between a center line passing through the icon and a horizontal line. In the present embodiment, the roll angle and the pitch angle are recognizable in the aforementioned method, however, the display method is not limited to the above and the other display method is acceptable.

In addition, the captured image data 1302 where the travelling direction of the vehicle 1 is captured by the imaging portion 16a serves as the captured image data obtained after the rotation control is performed. Accordingly, the driver may recognize a height relation within the captured image data.

Figure 20:
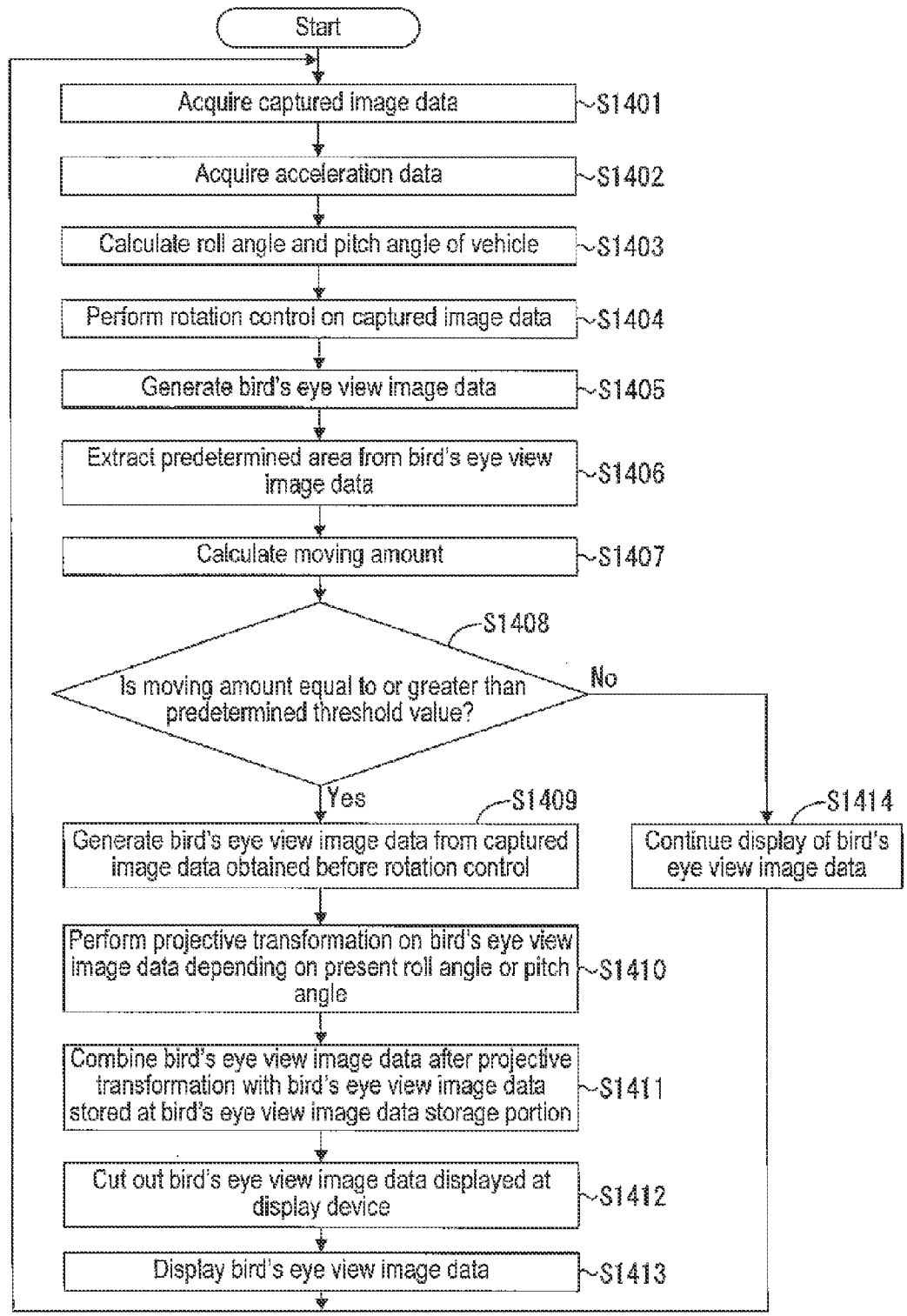
FIG. 20 is a flowchart illustrating procedures of a display processing on a display device 8 in a surroundings monitoring portion according to the second embodiment.

Next, the display processing on the display device 8 in the surroundings monitoring portion 700 according to the present embodiment is explained. FIG. 20 is a flowchart illustrating procedures of the aforementioned processing in the surroundings monitoring portion 700 according to the present embodiment.

First, the acquisition portion 701 acquires the captured image data from the imaging portions 16 (step S1401). Next, the acquisition portion 701 acquires the acceleration data from the acceleration sensors 26 (step S1402).

Then, the angle calculation portion 702 calculates the roll angle and the pitch angle of the vehicle 1 from the acceleration data (step S1403). The filtering control portion 703 performs filtering by low-pass filter relative to the calculated roll angle and the calculated pitch angle.

Then, the rotation control portion 711 performs the rotation control relative to the captured image data depending on the roll angle (step S1404).

Next, the bird's eye view image generation portion 712 generates the bird's eye view image data where a predetermined area in the travelling direction of the vehicle 1 which is present around the vehicle 1 is illustrated in an overhead view (step S1405).

The moving amount calculation portion 713 extracts the image data of a predetermined display range (area) from the generated bird's eye view image data (step S1406). In addition, the moving amount calculation portion 713 holds the image data extracted from the similar range from the bird's eye view image data in the past (for example, in a case where the previous moving amount is determined to reach or exceed a predetermined threshold value).

Then, the moving amount calculation portion 713 calculates the moving amount of the vehicle 1 based on the image data of the predetermined display range (area) extracted from the bird's eye view image data (step S1407).

Then, the image processing portion 704 determines whether or not the calculated moving amount is equal to or greater than the predetermined threshold value (step S1408). The threshold value is specified to be 10 cm, for example, however, the threshold value may be specified appropriately depending on an implementation mode In a case where the image processing portion 704 determines that the moving amount is equal to or greater than the threshold value (Yes in step S1408), the bird's eye view image generation portion 712 generates the bird's eye view image data from the presently captured image data serving as the captured image data before the rotation control is performed as in step S1404 (step S1409).

Afterwards, the conversion portion 714 performs the projective transformation on the bird's eye view image data depending on the present roll angle and pitch angle of the vehicle 1 (step S1410). The torsion of the bird's eye view image data generated by either one of the roll angle and the pitch angle is corrected by the projective transformation including the trapezoidal correction. When the roll angle is generated at the vehicle 1, the vehicle 1 is inclined with the axis of the wheel 3, for example, instead of being inclined with reference to a center of gravity. Therefore, a displacement occurs in the left-right direction. Thus, the conversion portion 714 according to the embodiment performs an offset correction on the displacement in the left-right direction. In the same manner, the offset correction in the front-rear direction is performed in a case where the pitch angle is generated.

Next, the composition portion 715 combines the present bird's eye view image data after the projective transformation is performed with the bird's eye view image data stored at the bird's eye view image storage portion (step S1411). The composite portion 715 performs the rotation control on the bird's eye view image data stored at the bird's eye view image storage portion 706 so as to conform to the turning angle θ1 obtained before the composition in a case where the vehicle 1 turns at the turning angle θ1.

Then, the output portion 705 cuts out the bird's eye view image data displayed at the display device 8 from the bird's eye view image data stored at the bird's eye view image storage portion 706 (step S1412). Thereafter, the output portion 705 adds various pieces of information to the bird's eye view image data that is cut out and outputs the data to the display device 8 (step S1413).

Meanwhile, in a case where the image processing portion 704 determines that the moving amount is smaller than the predetermined threshold value (No in step S1408), the image processing portion 704 continues outputting the bird's eye view image data and the like already displayed at the display device 8 (step S1414).

Third Embodiment

In the second embodiment, the embodiment where the bird's eye view image data is displayed for confirming the state of the vehicle 1 is explained. Nevertheless, the embodiment is not limited to the display of only the bird's eye view image data and various pieces of information for confirming present state may be added to the bird's eye view image data. Thus, in the third embodiment, an example where various pieces of information are added to the bird's eye view image data is explained.

Figure 21:
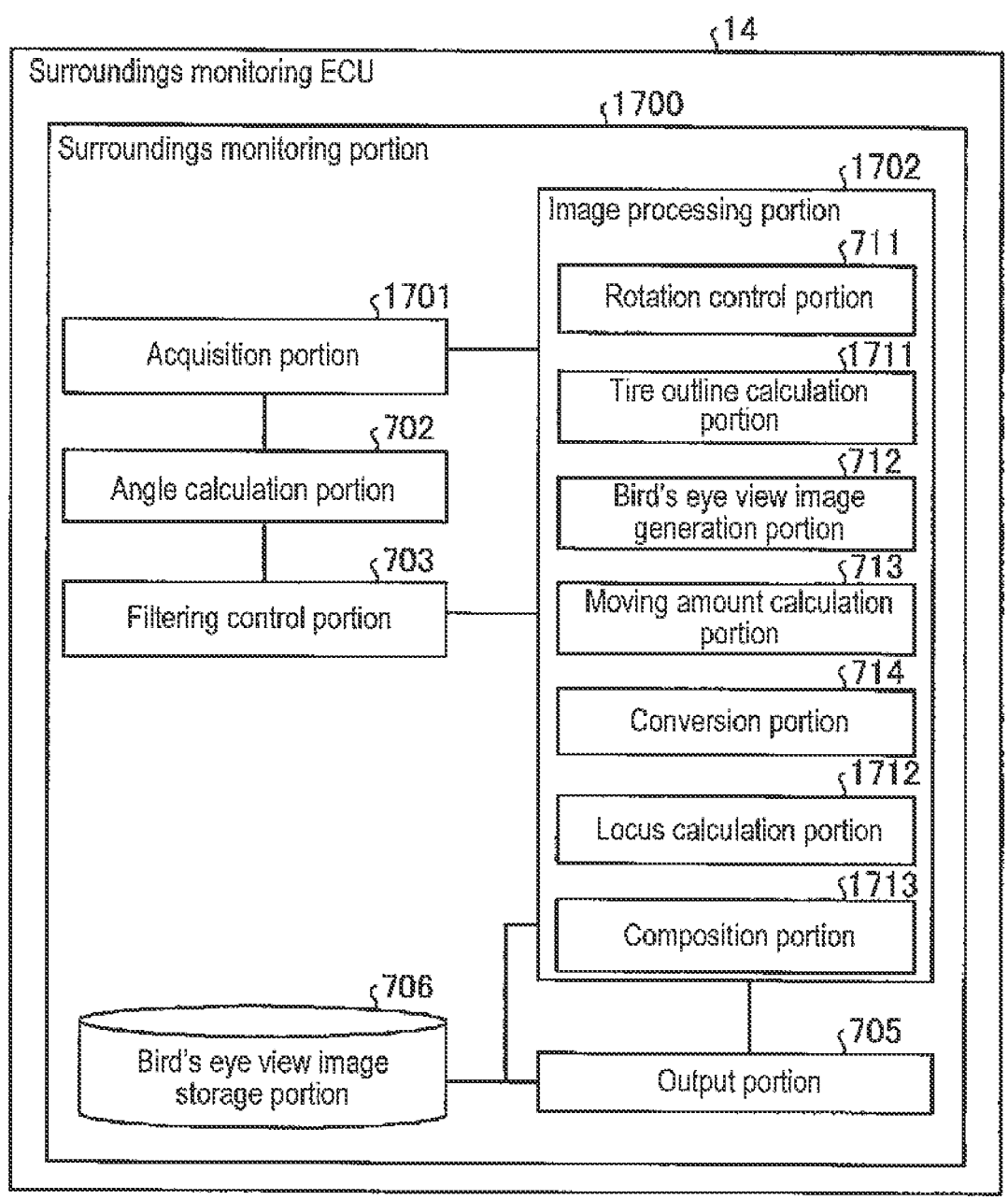
FIG. 21 is a block diagram illustrating a construction of a surroundings monitoring portion realized within a surroundings monitoring ECU according to the third embodiment.

First, a construction of a surroundings monitoring portion 1700 according to the third embodiment is explained. FIG. 21 is a block diagram illustrating the construction of the surroundings monitoring portion 1700 realized within the surroundings monitoring ECU 14 according to the present embodiment.

The surroundings monitoring portion 1700 illustrated in FIG. 21 is different from the surroundings monitoring portion 700 in the first embodiment in a point where the acquisition portion 701 is changed to an acquisition portion 1701 performing a different processing from the acquisition portion 701 and the image processing portion 704 is changed to an image processing portion 1702 performing a different processing from the image processing portion 704.

The acquisition portion 1701 acquires the captured image data and the acceleration data, in the same way as the second embodiment, and also acquires a suspension detection result indicating a depression degree of a suspension of the front wheels 3F from a stroke sensor (not illustrated) and a detection result of the steering angle of each of the front wheels 3F and the rear wheels 3R from the steering angle sensor 19. In the present embodiment, the acquired suspension detection result and steering angle detection result are output to the image processing portion 1702.

The image processing portion 1702 is different from the image processing portion 704 in the second embodiment in a point where a tire outline calculation portion 1711 and a locus calculation portion 1712 are added and the composition portion 715 in the second embodiment is changed to a composition portion 1713 performing a different processing from the processing performed by the composition portion 715.

The tire outline calculation portion 1711 calculates an outline of a tire that should be superimposed on the bird's eye view image data based on the suspension detection result and the detection result of the steering angle acquired by the acquisition portion 1701. For example, in a case where the camera is placed on a basis of the bird's eye view, the front wheels 3F and the rear wheels 3R are shown largely as approaching the camera when the suspension is depressed, and are shown small when the suspension is extended. Thus, in the present embodiment, in order to display the tire outline of the vehicle 1 on the bird's eye view image data, the tire outline calculation portion 1711 calculates the tire outline configuration (size and angle of each of the front wheels 3F) that should be superimposed on the bird's eye view image data based on the suspension detection result and the steering angle.

The locus calculation portion 1712 calculates an estimated moving locus in the travelling direction of the vehicle 1 based on the steering angle of the front wheels 3F and the steering angle of the rear wheels 3R. The locus calculation portion 1712 according to the present embodiment calculates the estimated moving locus that should be added to the present captured image data as the estimated moving locus of the front wheels 3F and calculates the estimated moving locus that should be added to the bird's eye view image data as the estimated moving locus of the rear wheels 3R. The estimated moving loca that are calculated are added to the captured image data and the bird's eye view image data and then output by the output 705.

In addition, the composition portion 1713 combines the bird's eye view image data stored at the bird's eye view image storage portion 706 with the bird's eye view image data obtained after the projective transformation is performed by the conversion portion 714 in the same processing as the second embodiment, and thereafter adds a mark by which the steering angle and the size of each of the front wheels 3F are recognizable to a position where each of the front wheels 3 is estimated to presently exist on the bird's eye view image data obtained after the composition is performed.

Each time the composition portion 1713 performs the composition, the mark is added to the position where each of the front wheels 3R exists so that the moving locus of the front wheel 3R is displayed at the bird's eye view image data. Then, the output portion 705 outputs the screen information at the display device 8 based on the bird's eye view image data composited by the composition portion 1713.

Figure 22:
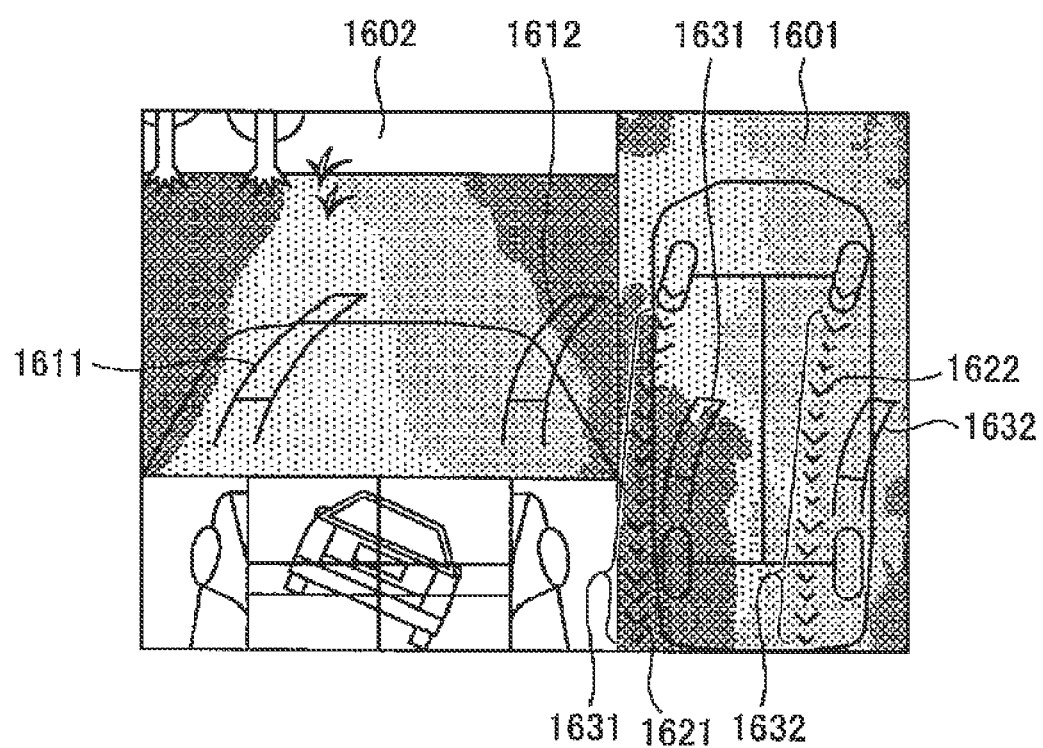
FIG. 22 is a diagram illustrating an example of screen information output by an output portion according to the third embodiment.

FIG. 22 is a diagram illustrating an example of the screen information output by the output portion 705 according to the third embodiment. In the example illustrated in FIG. 22, in addition to bird's eye view image data 1601, captured image data 1602 capturing the travelling direction of the vehicle 1 by the imaging portion 16a is shown, for example.

In the captured image data 1602 capturing the travelling direction, estimated moving loca 1611, 1612 of the front wheels 3F (display element indicating a planned course) calculated by the locus calculation portion 1702 are indicated.

Meanwhile, in the bird's eye view image data 1701, moving loca 1621, 1622 of the vehicle 1 generated because of the marks which are continuously added on a basis of the outlines of the front wheels 3F are indicated. Based on the size of each of the marks included in the moving loca 1621, 1622, the driver may recognize protrusion and recess on the road surface. That is, at a portion where the large mark is added, the suspension is largely depressed. In other words, an obstacle such as a stone, for example, is highly possibly present. Thus, the driver may drive, while confirming the aforementioned marks, to operate so that the rear wheels 3F and a differential (not illustrated) are inhibited from collision.

In addition, in the bird's eye view image data 1602, estimated moving loca 1631, 1632 of the rear wheels 3F calculated by the locus calculation portion 1703 are indicated. Because the driver can recognize the estimated moving loca 1631, 1632, the driver may restrain the rear wheels 3R from being collided with an obstacle by driving the vehicle so that the rear wheels 3R overlap the moving loca of the front wheels 3F which have not been collided with the obstacle.

Here, in a case where the bird's eye view image generation portion 1702 adds the marks indicating the positions of the front wheels 3F to the bird's eye view image data in the past, the bird's eye view image generation portion 1702 may differentiate colors or shapes based on information other than the suspension detection results. For example, the color or shape at the positions where the front wheels 3F slip may be differentiated. As a result, safety when the driver drives the vehicle may improve.

The surroundings monitoring portion in the aforementioned embodiments include the aforementioned construction so as to easily recognize the surrounding state including the ground below the vehicle 1. Accordingly, a load of driving is reduced to thereby enhance safety.

The second embodiment or the third embodiment is an example of a vehicle control apparatus or program according to either of the followings [1]-[8].

[1]

A vehicle control apparatus including:

an acquisition portion acquiring captured image data output from an imaging portion that is provided at a vehicle and that images a surrounding of the vehicle and vehicle state data output from a vehicle state detection portion provided at the vehicle;

a control portion performing a rotation control on the captured image data based on an inclination in a left-right direction of the vehicle relative to a horizontal direction which serves as a direction included in a horizontal plane orthogonal to a direction of gravity, the inclination in the left-right direction of the vehicle being calculated from the vehicle state data; and a generation portion generating bird's eye view image data indicating a ground in a surrounding of the vehicle in an overhead view based on the captured image data on which the rotation control is performed by the control portion.

[2]

The vehicle control apparatus according to [1], wherein
the generation portion generates first bird's eye view image data based on first captured image data on which the rotation control is performed by the rotation control portion and generates second bird's eye view image data based on second captured image data which is captured by the imaging portion after the first captured image data is captured and then the vehicle moves and on which the rotation control is performed by the rotation control portion, the vehicle control apparatus further including a composition portion combines the first bird's eye view image data and the second bird's eye view image data.

[3]

The vehicle control apparatus according to [1] or [2], wherein
the acquisition portion acquires an acceleration of the vehicle as the vehicle state data from the vehicle state detection portion, the rotation control portion further performs the rotation control on the captured image data depending on a roll angle indicating an inclination around a front-rear axis of the vehicle obtained from the acceleration data with an origin at a position coordinate within a display region of the captured image data, the position coordinate corresponding to a center of a lens used for imaging by the imaging portion.

[4]

The vehicle control apparatus according to any one of [1] through [3], further including a conversion portion performing a projective transformation which is specified on a basis of a second roll angle relative to the second captured image data which is cut out at a display range specified on a basis of the second roll angle obtained from a second acceleration data which is acquired when the second captured image data is captured, wherein
the composition portion combines the first bird's eye view image data and the second bird's eye view image data which is converted by the conversion portion.

[5]

The vehicle control apparatus according to any one of [1] through [4], wherein the rotation control portion performs the rotation control on the captured image data depending on a difference between a first roll angle obtained from a first acceleration data that is acquired when the first captured image data is captured and a second roll angle obtained from the second acceleration data that is acquired when the second captured image data is captured.

[6] The vehicle control apparatus according to any one of [1] through [5], wherein the composition portion combines the first bird's eye view image data captured before the vehicle moves and including a ground below the vehicle and the second bird's eye view image data.

[7] The vehicle control apparatus according to any one of [1] through [6], further including an output portion outputting information that represents either the roll angle or a pitch angle indicating an inclination around a left-right axis of the vehicle and bird's eye view image data composited by the composition portion.

[8] A program configured to cause a computer to execute;
an acquisition step acquiring captured image data output from an imaging portion that is provided at a vehicle and that images a surrounding of the vehicle and vehicle state data output from a vehicle state detection portion provided at the vehicle;
a rotation control step performing a rotation control on the captured image data based on an inclination in a left-right direction of the vehicle relative to a horizontal direction which serves as a direction included in a horizontal plane orthogonal to a direction of gravity, the inclination in the left-right direction of the vehicle being calculated from the vehicle state data; and
a generation step generating bird's eye view image data indicating a ground in a surrounding of the vehicle in an overhead view based on the captured image data on which the rotation control is performed by the rotation control step.

The embodiments of the present invention have been explained, however, the present embodiments are proposed as examples and not intended to limit the scope of the invention. The above new embodiments may be performed in other various modes. Without departing from the spirit of the invention, various omissions, replacements and changes may be made. The embodiments and alternatives thereof are included within the spirit and scope of the invention and included in the invention described in the scope of claims and equivalents thereof.

EXPLANATION OF REFERENCE NUMERALS

500: surroundings monitoring portion, 501: acquisition portion, 502: angle calculation portion, 503: filtering control portion, 504: image processing portion, 505: output portion, 521: rotation control portion, 522: reduction/enlargement control portion, 523: movement control portion, 524: composition portion, 700: surroundings monitoring portion, 701: acquisition portion, 702: angle calculation portion, 703: filtering control portion, 704: image processing portion, 705: output portion, 706: bird's eye view image storage portion, 711: rotation control portion, 712: bird's eye view image generation portion, 713: moving amount calculation portion, 714: conversion portion, 715: composition portion

The invention claimed is:

1. A vehicle control apparatus comprising:
a controller including at least one processor, the controller acquiring captured image data output from a camera that is provided at a vehicle and that images a surrounding of the vehicle and vehicle state data output from a sensor provided at the vehicle,
the controller performing, while the captured image data is mapped in a two-dimensional orthogonal coordinate system, a rotation control on the captured image data based on an inclination in a left-right direction of the vehicle relative to a horizontal direction which serves as a direction included in a horizontal plane orthogonal to a direction of gravity, the inclination in the left-right direction of the vehicle being calculated from the vehicle state data,
the controller acquiring acceleration data of the vehicle serving as the vehicle state data from the sensor,
the controller performing the rotation control on the captured image data depending on a roll angle in a manner that a horizontal line included in a subject captured in the captured image data is rotated and becomes substantially parallel to a lateral-direction side of a display region of a display device, the roll angle indicating an inclination around a front-rear axis of the vehicle calculated from the acceleration data,
the controller is further configured to correct an inclination of the captured image data by rotating the captured image data about a position coordinate set on the captured image data,
the controller is further configured to superimpose information representing a future estimated course of the vehicle, based on a current steering angle of the vehicle, on the captured image data, the information being an image shape of the future estimated course of the vehicle that is rotatable, and the rotation performed by the rotation control applies to the captured image data as a whole, including the information superimposed on the captured image data, such that the captured image data, including the image shape, is rotated based on the roll angle indicating the inclination around the front-rear axis of the vehicle.

2. The vehicle control apparatus according to claim 1, wherein the controller further performs an enlargement processing or a reduction processing on the captured image data.

3. The vehicle control apparatus according to claim 1, wherein the position coordinate corresponds to a center of a lens, and the controller further moves the position coordinate corresponding to the center of the lens from a center of the display region relative to the captured image data.

4. The vehicle control apparatus according to claim 3, wherein the controller further moves the position coordinate corresponding to the center of the lens from the center of the display region to an upper direction within the display region.

5. The vehicle control apparatus according to claim 1, wherein the captured image data is displayed at the display device, the display device displaying, together with the captured image data, information that represents at least one of a roll angle indicating an inclination around a front-rear axis of the vehicle and a pitch angle indicating an inclination around a left-right axis of the vehicle.

6. The vehicle control apparatus according to claim 1, wherein the controller further acquires information indicating whether or not the vehicle is switched to a mode for off-road, and the controller performs the rotation control on the captured image data depending on the vehicle state data in a case where the vehicle is switched to the mode for off-road.

7. The vehicle control apparatus according to claim 1, wherein the controller is further configured to generate bird's eye view image data indicating a ground in a surrounding of the vehicle in an overhead view based on the captured image data on which the rotation control is performed by the controller.

8. The vehicle control apparatus according to claim 7, wherein
the controller is further configured to acquire an image captured from the camera at a first time as an image of the captured image data, the image including a first ground that is not directly below an undercarriage of the vehicle at the first time, and
when the first ground is directly below the undercarriage at a second time, later than the first time, the controller is further configured to output the bird's eye view image data to the display device at the second time such that the display device indicates the first ground as directly below the undercarriage, based on the image of the captured image data captured at the first time.

9. The vehicle control apparatus according to claim 1, wherein the sensor is an acceleration sensor, and the captured image data is rotated in the two-dimensional orthogonal coordinate system in accordance with the roll angle of the vehicle sensed by the acceleration sensor, the two-dimensional orthogonal coordinate system being defined with an origin set at a center of an imaging lens.

10. A computer program product including programmed instructions embodied in and stored on a non-transitory computer readable medium, wherein the instructions, when executed by a computer, cause the computer to perform:
acquiring captured image data output from a camera that is provided at a vehicle and that images a surrounding of the vehicle and vehicle state data output from a sensor provided at the vehicle, the acquiring including acquiring acceleration data of the vehicle serving as the vehicle state data; and
performing, while the captured image data is mapped in a two-dimensional orthogonal coordinate system, a rotation control on the captured image data based on an inclination in a left-right direction of the vehicle relative to a horizontal direction which serves as a direction included in a horizontal plane orthogonal to a direction of gravity, the inclination in the left-right direction of the vehicle being calculated from the vehicle state data, the performing including performing the rotation control on the captured image data depending on a roll angle in a manner that a horizontal line included in a subject captured in the captured image data is rotated and becomes substantially parallel to a lateral-direction side of a display region of a display device, the roll angle indicating an inclination around a front-rear axis of the vehicle obtained from the acceleration data,
correcting an inclination of the captured image data by rotating the captured image data about a position coordinate set on the captured image data,
superimposing information representing a future estimated course of the vehicle, based on a current steering angle of the vehicle, on the captured image data, the information being an image shape of the vehicle course that is rotatable, and the rotation performed by the rotation control applies to the captured image data as a whole, including the information superimposed on the captured image data, such that the captured image data, including the image shape, is rotated based on the roll angle indicating the inclination around the front-rear axis of the vehicle.

11. The computer program product according to claim 10, wherein the instructions, when executed by the computer, further causes the computer to perform:
generating bird's eye view image data indicating a ground in a surrounding of the vehicle in an overhead view based on the captured image data on which the rotation control is performed in the performing.

12. The computer program product according to claim 11, wherein the instructions, when executed by the computer, further causes the computer to perform:
acquiring an image captured from the camera at a first time as an image of the captured image data, the image including a first ground that is not directly below an undercarriage of the vehicle at the first time, and
outputting, when the first ground is directly below the undercarriage at a second time, later than the first time, the bird's eye view image data to the display device at the second time such that the display device indicates the first ground as directly below the undercarriage, based on the image of the captured image data captured at the first time.

13. A vehicle control apparatus comprising:
a controller including at least one processor, the controller acquiring captured image data output from a camera that is provided at a vehicle and that images a surrounding of the vehicle and vehicle state data output from a sensor provided at the vehicle,
the controller performing, while the captured image data is mapped in a two-dimensional orthogonal coordinate system, a rotation control on the captured image data based on an inclination in a left-right direction of the vehicle relative to a horizontal direction which serves as a direction included in a horizontal plane orthogonal to a direction of gravity, the inclination in the left-right direction of the vehicle being calculated from the vehicle state data,
the controller acquiring acceleration data of the vehicle serving as the vehicle state data from the sensor,
the controller performing the rotation control on the captured image data depending on a roll angle in a manner that a horizontal line included in a subject captured in the captured image data is rotated and becomes substantially parallel to a lateral-direction side of a display region of a display device, the roll angle indicating an inclination around a front-rear axis of the vehicle calculated from the acceleration data,
the controller is further configured to correct an inclination of the captured image data by rotating the captured image data about a position coordinate set on the captured image data,
the controller is further configured to generate bird's eye view image data indicating a ground in a surrounding of the vehicle in an overhead view based on the captured image data on which the rotation control is performed by the controller,
the controller is further configured to acquire an image captured from the camera at a first time as an image of the captured image data, the image including a first ground that is not directly below an undercarriage of the vehicle at the first time, and
when the first ground is directly below the undercarriage at a second time, later than the first time, the controller is further configured to output the bird's eye view image data to the display device at the second time such that the display device indicates the first ground as directly below the undercarriage, based on the image of the captured image data captured at the first time.

\* \* \* \* \*